US012785098B2

(12) United States Patent
Qian et al.

(10) Patent No.: US 12,785,098 B2
(45) Date of Patent: Nov. 3, 2026

(54) LITHIUM IRON PHOSPHATE BATTERY

(71) Applicant: SHENZHEN CAPCHEM TECHNOLOGY CO., LTD., Shenzhen (CN)

(72) Inventors: Yunxian Qian, Shenzhen (CN); Shiguang Hu, Shenzhen (CN); Xiaoxia Xiang, Shenzhen (CN); Hongmei Li, Shenzhen (CN); Chaowei Cao, Shenzhen (CN); Yonghong Deng, Shenzhen (CN)

(73) Assignee: SHENZHEN CAPCHEM TECHNOLOGY CO., LTD., Shenzhen (CN)

( * ) Notice: Subject to any disclaimer, the term of this patent is extended or adjusted under 35 U.S.C. 154(b) by 593 days.

(21) Appl. No.: 18/279,052

(22) PCT Filed: Mar. 29, 2022

(86) PCT No.: PCT/CN2022/083551
§ 371 (c)(1),
(2) Date: Aug. 25, 2023

(87) PCT Pub. No.: WO2022/218143
PCT Pub. Date: Oct. 20, 2022

(65) Prior Publication Data

US 2024/0194871 A1 Jun. 13, 2024

(30) Foreign Application Priority Data

Apr. 13, 2021 (CN) ......................... 202110392924.0

(51) Int. Cl.
*H01M 4/58* (2010.01)
*H01M 4/02* (2006.01)
(Continued)

(52) U.S. Cl.
CPC ....... *H01M 4/5825* (2013.01); *H01M 10/052* (2013.01); *H01M 10/0567* (2013.01);
(Continued)

(58) Field of Classification Search
CPC ............. H01M 4/5825; H01M 10/052; H01M 10/0567; H01M 2004/021; H01M 2300/0025
See application file for complete search history.

(56) References Cited

U.S. PATENT DOCUMENTS

| | | | | |
|---|---|---|---|---|
| 3,663,569 A | 5/1972 | Lew | | |
| 2021/0005933 A1* | 1/2021 | Kinoshita | H01G 11/62 | |
| 2023/0155180 A1* | 5/2023 | Yamatani | H01G 11/24 | 429/209 |

FOREIGN PATENT DOCUMENTS

| | | |
|---|---|---|
| CN | 1355944 A | 6/2002 |
| CN | 103947030 A | 7/2014 |

(Continued)

OTHER PUBLICATIONS

CN-111755753-A English machine translation (Year: 2020).*
International Search Report of PCT Patent Application No. PCT/CN2022/083551 issued on Jun. 15, 2022.

*Primary Examiner* — Scott J. Chmielecki

(57) ABSTRACT

Provided is a lithium iron phosphate battery, comprising a positive electrode, a negative electrode and a non-aqueous electrolyte, wherein the positive electrode comprises a positive electrode material layer with a compacted density of 2.3-2.8g/cc, and the positive electrode material layer comprises a positive electrode active material, the positive electrode active material comprises $LiFePO_4$; the non-aqueous electrolyte comprises a solvent, an electrolyte salt, vinylene carbonate and a compound represented by Structural formula 1; an addition amount of the compound represented by Structural formula 1 is 0.01-5% based on a
(Continued)

total mass of the non-aqueous electrolyte being 100%. The lithium iron phosphate battery provided by the application adopts the combination of vinylene carbonate and the compound represented by Structural formula 1, which can inhibit the generation of lithium dendrites and dissolution of Fe, and ultimately improve the high-temperature and safety performance of the High-compacted-density lithium iron phosphate battery.

A-D-B-E-C Structural formula 1

14 Claims, 2 Drawing Sheets

(51) Int. Cl.
*H01M 10/052* (2010.01)
*H01M 10/0567* (2010.01)

(52) U.S. Cl.
CPC *H01M 2004/021* (2013.01); *H01M 2004/028* (2013.01); *H01M 2300/0025* (2013.01)

(56) References Cited

FOREIGN PATENT DOCUMENTS

| | | | | | |
|---|---|---|---|---|---|
| CN | 105977525 | A | | 9/2016 | |
| CN | 108808091 | A | | 11/2018 | |
| CN | 109119686 | A | | 1/2019 | |
| CN | 109390630 | A | | 2/2019 | |
| CN | 109802179 | A | | 5/2019 | |
| CN | 109942534 | A | | 6/2019 | |
| CN | 110010970 | A | | 7/2019 | |
| CN | 110383564 | A | | 10/2019 | |
| CN | 110931863 | A | | 3/2020 | |
| CN | 110943253 | A | | 3/2020 | |
| CN | 111628219 | A | | 9/2020 | |
| CN | 111755753 | A | * | 10/2020 | ........ H01M 10/0567 |
| CN | 114068936 | A | | 2/2022 | |
| CN | 114094109 | A | | 2/2022 | |
| JP | 2001023684 | A | | 1/2001 | |
| JP | 2013525964 | A | | 6/2013 | |
| KR | 10-2015-0076417 | A | | 7/2015 | |
| KR | 10-2015-0099521 | A | | 8/2015 | |
| KR | 10-2020-0005870 | A | | 1/2020 | |
| WO | 2017138453 | A1 | | 8/2017 | |
| WO | 2020/022452 | A1 | | 1/2020 | |

* cited by examiner

LITHIUM IRON PHOSPHATE BATTERY

TECHNICAL FIELD

The application belongs to the technical field of secondary batteries, and particularly relates to a lithium iron phosphate battery.

BACKGROUND

Lithium-ion battery has been widely used in mobile communication, notebook computer and other fields since it was put into the market in 1991 because of its advantages of high working voltage, long cycle life, high energy density and no memory effect. In recent years, with the rapid development and popularization of new energy vehicles, consumers have higher and higher requirements for the energy density of lithium-ion batteries. Compared with ternary batteries, lithium iron phosphate batteries have advantages in cycle life, safety and cost, but there is still a big gap between lithium iron phosphate and ternary materials. At present, the energy density of single lithium iron phosphate battery is mainly improved by increasing the compacted density of the positive electrode of lithium iron phosphate.

However, blindly increasing the compacted density of the positive electrode of lithium iron phosphate would first increase the dissolution of Fe ions in the positive electrode, and the oxidative decomposition of electrolyte would be intensified, which will lead to poor storage and cycle performance of the battery at high temperature. Secondly, it will lead to the generation of lithium dendrites at the electrode interface, which will lead to short circuit and fire of the battery, and seriously affect the safety performance of the battery. This restricts the application of the positive electrode material of high-compacted-density lithium iron phosphate. Although positive electrode material manufacturers have also used various techniques of doping and coating to improve the structural stability of the positive electrode material, it is still a great challenge to improve the cycle performance, storage performance, and the dissolution of Fe ions at high temperature if the current commercial electrolyte is applied to the positive electrode material of high-compacted-density lithium iron phosphate. Therefore, it is of great significance to develop an additive for high-compacted-density (2.3-2.8 g/cc) lithium iron phosphate battery for the high-temperature storage, high-temperature cycle performance and Fe ion dissolution of lithium iron phosphate battery.

SUMMARY

Aiming at the problems of lithium dendrite and iron ion dissolution in the existing high-compacted-density lithium iron phosphate battery, the application provides a lithium iron phosphate battery.

The technical solutions adopted by the application to solve the technical problems are as follows:

The application provides a lithium iron phosphate battery, which comprises a positive electrode, a negative electrode and a non-aqueous electrolyte, the positive electrode comprises a positive electrode material layer with a compacted density of 2.3-2.8 g/cc, and the positive electrode material layer comprises a positive electrode active material, the positive electrode active material comprises $LiFePO_4$;

the non-aqueous electrolyte comprises a solvent, an electrolyte salt, vinylene carbonate and a compound represented by Structural formula 1:

A-D-B-E-C    Structural formula 1

A, B and C are each independently selected from a cyclic carbonate group, a cyclic sulfate group, a cyclic sulfite group, a cyclic sulfonate group, a cyclic sulfone group, a cyclic sulfoxide group, a cyclic carboxylate group or a cyclic anhydride group;

D and E are each independently selected from a single bond, or a group containing a hydrocarbylene group, an ether bond, a sulfur-oxygen double bond or a carbon-oxygen double bond; and an addition amount of the compound represented by Structural formula 1 is 0.01-5% based on a total mass of the non-aqueous electrolyte being 100%.

Optionally, an addition amount of vinylene carbonate is 0.01-5%, more preferably 0.1-2%, based on the total mass of the non-aqueous electrolyte being 100%.

Optionally, a surface of the positive electrode material layer is detected by X-ray photoelectron spectroscopy, and when 1 s peak of carbon is obtained at 284.5eV, a characteristic peak of S appears at a range of 162-174 eV.

Optionally, the charging and discharging voltage range of the lithium iron phosphate battery is 2.0-3.8V.

Optionally, the number of the cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups that each of A, B and C independently contains is 1-5, and the total number of the cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups that A, B and C contain is 10 or less.

Optionally, A and C are each independently selected from a group represented by Structural formula 2:

Structural formula 2

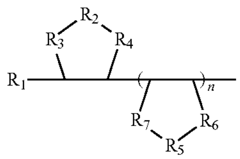

wherein n is an integer from 0 to 4, and $R_1$ is selected from hydrogen, halogen, a C1-C5 hydrocarbon group or halogenated hydrocarbon group; $R_2$, $R_3$, $R_4$, $R_5$, $R_6$ and $R_7$ are each independently selected from a C1-C3 hydrocarbylene group, a C1-C3 alkoxy group, oxygen atom,

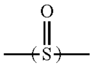, 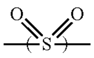 or 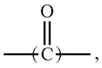, at least one of $R_2$, $R_3$ and $R_4$ is selected from

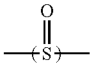, 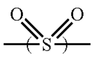 or 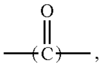, at least one of $R_2$, $R_3$ and $R_4$ is selected from oxygen atom, at least one of $R_5$, $R_6$ and $R_7$ is selected from

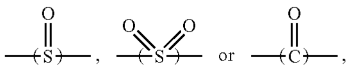

and at least one of $R_5$, $R_6$ and $R_7$ is selected from oxygen atom.

Optionally, B is selected from a group represented by Structural formula 3:

Structural formula 3

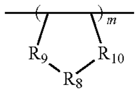

wherein m is an integer from 1 to 4, $R_8$, $R_9$ and $R_{10}$ are each independently selected from a C1-C3 hydrocarbylene group, a C1-C3 alkoxy group, oxygen atom,

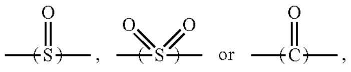

at least one of $R_8$, $R_9$ and $R_{10}$ is selected from

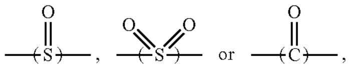

and at least one of $R_8$, $R_9$ and $R_{10}$ is selected from oxygen atom.

Optionally, D and E are each independently selected from a group represented by Structural formula 4:

Structural formula 4

$$-(R_{11}-R_{12}-R_{13})_z-$$

wherein z is an integer from 0 to 4, $R_{11}$ and $R_{13}$ are each independently selected from a single bond or a C1-C5 hydrocarbylene group, and $R_{12}$ is selected from a single bond,

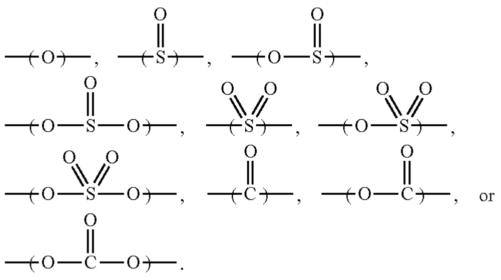

Optionally, D and E are each independently selected from a single bond or a C1-C5 hydrocarbylene group, A, B and C are each independently selected from a substituted or unsubstituted cyclic carbonate group, cyclic sulfate group, cyclic sulfite group, cyclic sulfonate group, cyclic sulfone group, cyclic sulfoxide group, cyclic carboxylate group or cyclic anhydride group, and when A, B or C are substituted, the substituent is selected from halogen, alkyl or a haloalkyl group.

Alternatively, A and C are the same, A and B are the same or different, and D and E are the same.

Optionally, the compound represented by Structural formula 1 is selected from one or more of the following compounds:

Compound 1

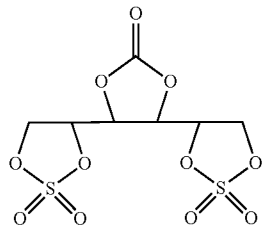

Compound 2

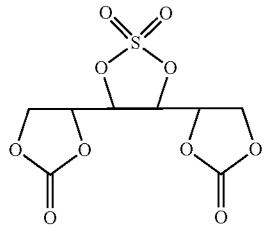

Compound 3

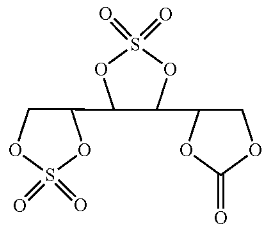

Compound 4

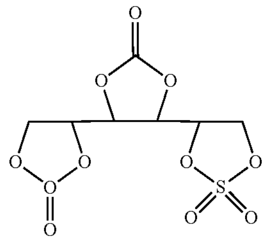

Compound 5

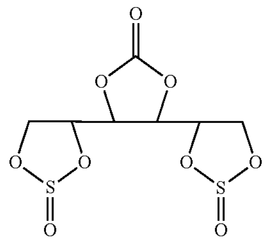

-continued
Compound 6
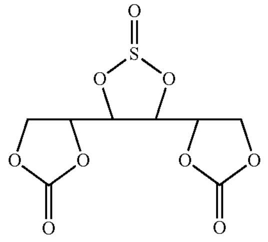
Compound 7
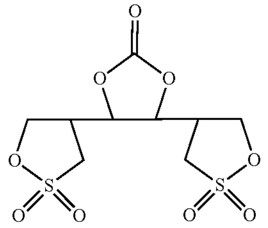
Compound 8
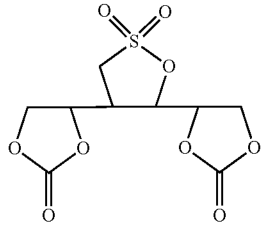
Compound 9
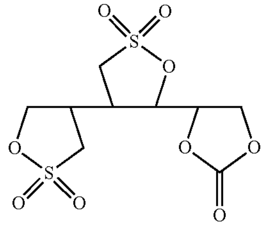
Compound 10
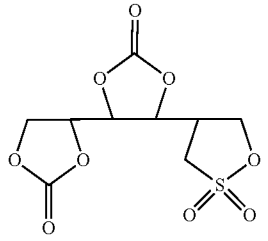
Compound 11
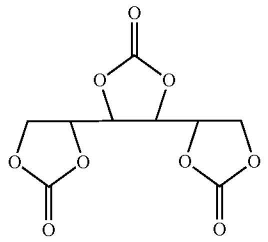
-continued
Compound 12
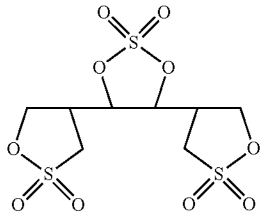
Compound 1-13
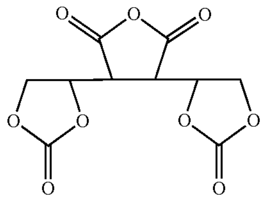
Compound 1-14
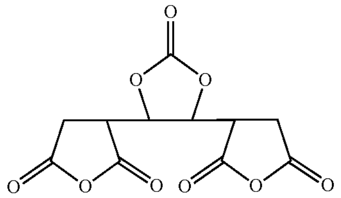
Compound 1-15
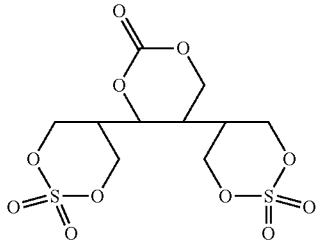
Compound 1-16
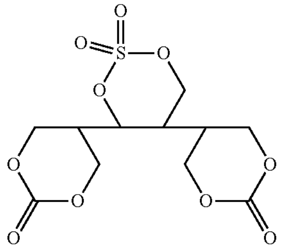
Compound 17
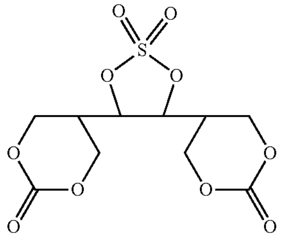

-continued
Compound 18
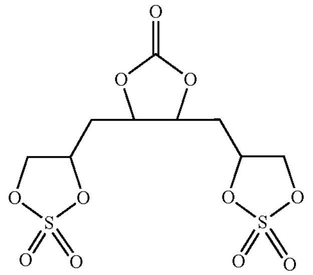
Compound 19
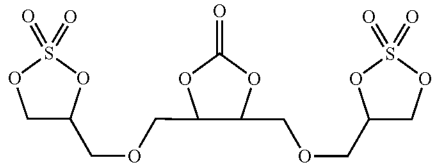
Compound 20
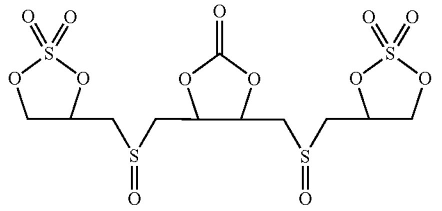
Compound 21
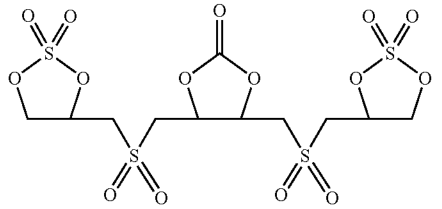
Compound 22
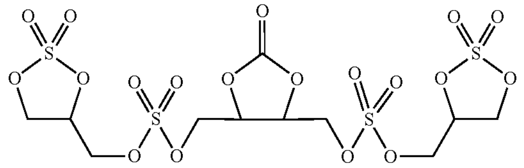
Compound 23
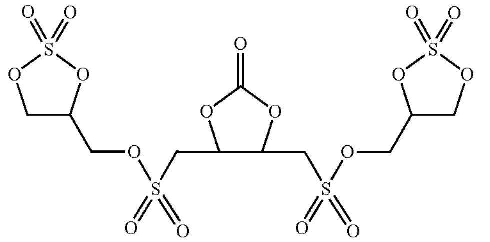
-continued
Compound 24
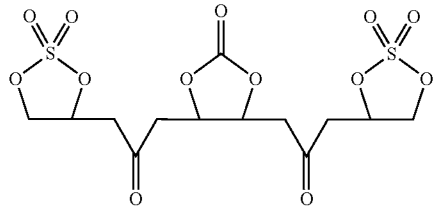
Compound 25
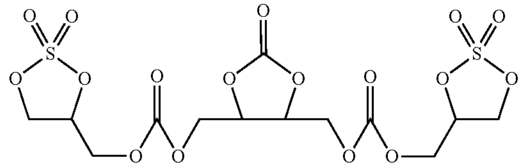
Compound 26
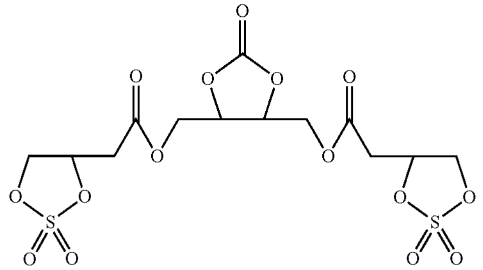
Compound 27
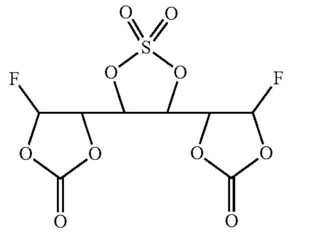
Compound 28
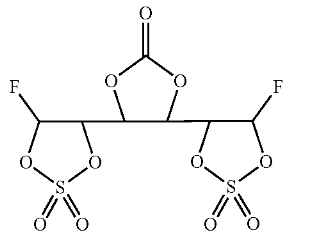
Compound 29
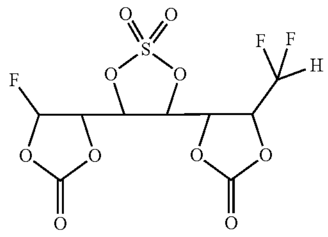

-continued

Compound 30

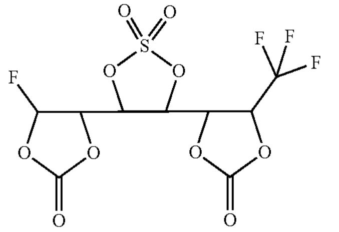

Compound 31

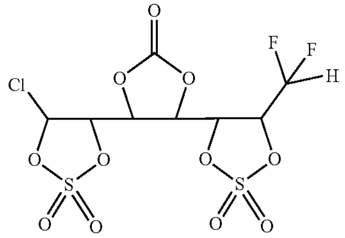

Compound 32

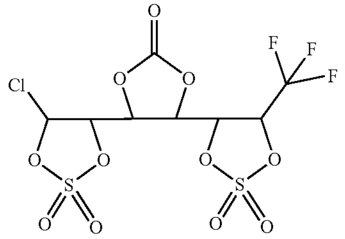

Compound 33

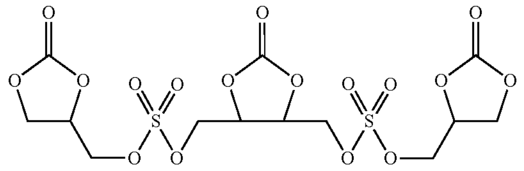

Compound 34

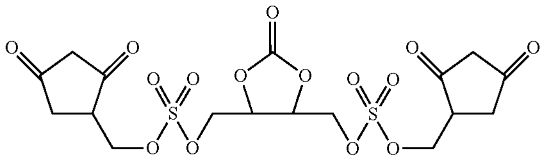

Compound 35

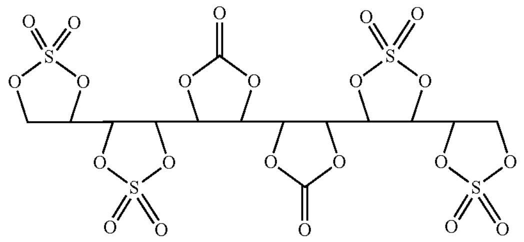

Compound 36

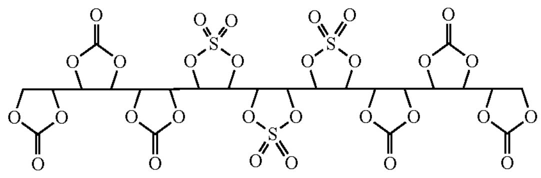

-continued

Compound 37

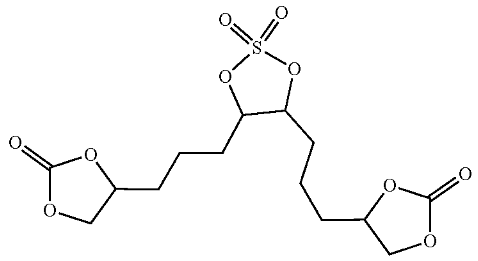

Compound 38

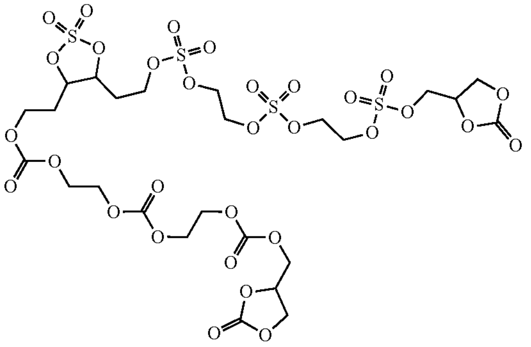

Compound 39

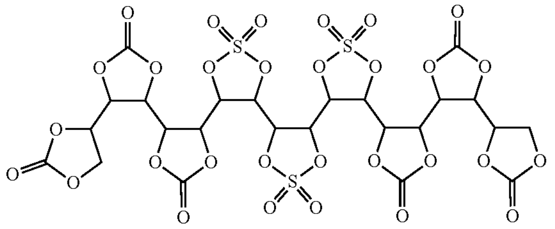

Compound 40

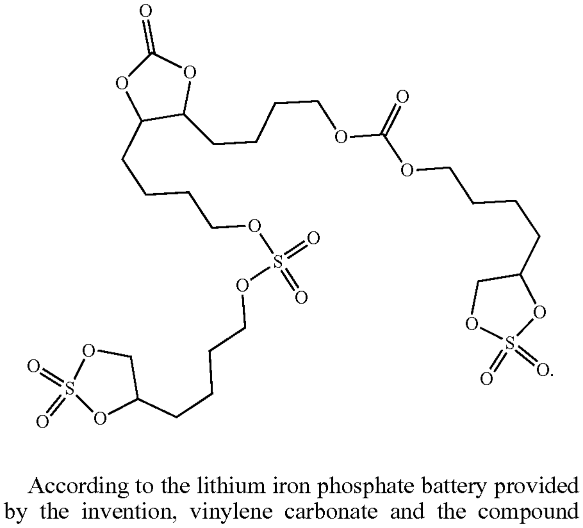

According to the lithium iron phosphate battery provided by the invention, vinylene carbonate and the compound shown in the structural formula 1 are added into the non-aqueous electrolyte, vinylene carbonate and the compound shown in the structural formula 1 participate in the formation of the interface film on the surfaces of the positive electrode and negative electrode. It is presumed that the decomposition product of vinylene carbonate and the decomposition product of the compound shown in the structural formula 1 together form an organic-inorganic embedded interface film. The interface film could effectively improve the migration rate of lithium ions during the high-temperature cycle of the battery, at the same time, it has a good protective effect on the electrode materials, reduces the redox reaction between the electrolyte and electrode materials, inhibits the generation of lithium dendrites at the negative electrode interface and the dissolution of Fe ions at the positive electrode, and ultimately improves the high-temperature performance and safety performance of lithium iron phosphate battery.

DETAILED DESCRIPTION OF DISCLOSED EMBODIMENTS

Figure 1:
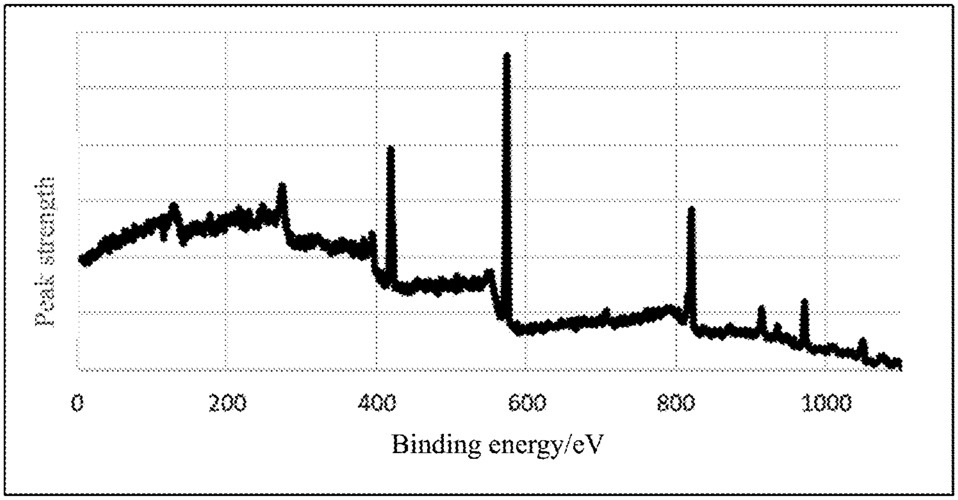
FIG. 1 is a full XPS spectrum of a battery positive plate after the battery capacity is screened according to Embodiment 5 of the present application.

In order to make the beneficial effects, technical solutions and technical problems solved by the present application clearer, the present application will be further illustrated in detail with reference to the drawings and embodiments. It should be understood that the specific embodiments described here are merely for illustrating the present application, not for limiting the present application.

The embodiment of the invention provides a lithium iron phosphate battery, comprising a positive electrode, a negative electrode and a non-aqueous electrolyte, wherein the positive electrode comprises a positive electrode material layer with a compacted density of 2.3-2.8 g/cc, and the positive electrode material layer comprises a positive electrode active material, the positive electrode active material comprises $LiFePO_4$;

the non-aqueous electrolyte comprises a solvent, an electrolyte salt, vinylene carbonate and a compound represented by Structural formula 1:

A-D-B-E-C Structural formula 1

A, B and C are each independently selected from a cyclic carbonate group, a cyclic sulfate group, a cyclic sulfite group, a cyclic sulfonate group, a cyclic sulfone group, a cyclic sulfoxide group, a cyclic carboxylate group or a cyclic anhydride group;

D, E is independently selected from a single bond or a hydrocarbylene group, an ether bond, a sulfur-oxygen double bond or a carbon-oxygen double bond;

an addition amount of the compound represented by Structural formula 1 is 0.01-5% based on a total mass of the non-aqueous electrolyte being 100%.

The inventors speculated that vinylene carbonate and the compound shown in the structural formula 1 participated in the formation of the interface film on the surfaces of the positive electrode and the negative electrode, and the decomposition products of vinylene carbonate and the compound shown in the structural formula 1 together formed an organic-inorganic embedded interface film, which can effectively improve the migration rate of lithium ions during the high-temperature cycle of the battery, at the same time, have a good protective effect on the electrode material, reduce the redox reaction between the electrolyte and the electrode material, inhibit the generation of lithium dendrites at the interface of the negative electrode and the dissolution of Fe ions at the positive electrode, and ultimately improve the high-temperature performance and safety performance of lithium iron phosphate battery.

Vinylene carbonate could form an organic interface with polymer structure on the electrode surface, but in a system of high-compacted-density lithium iron phosphate battery, this organic interface on the negative electrode is not conducive to the migration of lithium ions, thus lithium dendrites would be deposited on the surface of the negative electrode, and the reaction between the lithium dendrites and the electrolyte would cause further deterioration of battery performance and iron ion dissolution. The inventors found through experiments that, when vinylene carbonate and the compound represented by Structural formula 1 were both added to the non-aqueous electrolyte, a good synergistic effect could be produced with the high-compacted-density lithium iron phosphate battery. When the compound represented by Structural formula 1 was added, the compound represented by Structural formula 1 could form an interface film containing special components on the electrode surface, which could not only improve the lithium ion conductivity of the interface film, but also protect the positive and negative electrode structures and improve the stability of the battery material during high-temperature cycle.

In a preferred embodiment, the addition amount of the compound represented by Structural formula 1 is 0.1-2%.

Figure 2:
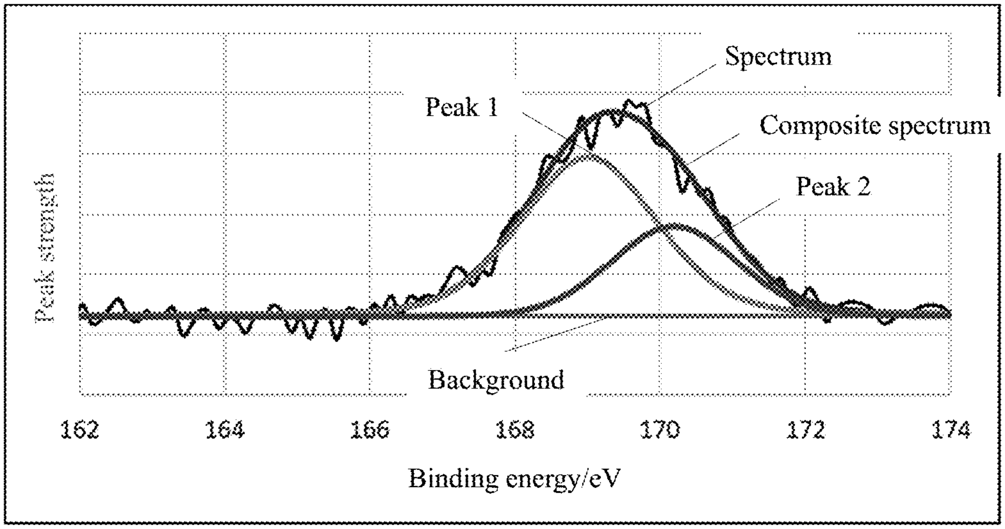
FIG. 2 is a fine spectrum of the characteristic peak in FIG. 1.

In some embodiments, the surface of the positive electrode material layer is detected by X-ray photoelectron spectroscopy, and when 1s peak of carbon is obtained at 284.5 eV, a characteristic peak of S appears at a range of 162-174 eV. As shown in FIGS. 1 and 2, which indicate that vinylene carbonate and the compound represented by Structural Formula 1 jointly formed an interface film on the surface of the positive electrode. The interface film has excellent organic and inorganic compositions, which significantly improves the performance of high-compacted-density lithium iron phosphate battery.

In some embodiments, the addition amount of the vinylene carbonate is 0.01-5% based on the total mass of the non-aqueous electrolyte being 100%.

In a preferred embodiment, the addition amount of the vinylene carbonate is 0.1-2% based on the total mass of the non-aqueous electrolyte being 100%.

In the lithium iron phosphate battery, vinylene carbonate and the compound represented by Structural formula 1 have a good coordination relationship, and when the addition amount of vinylene carbonate or any one of the compound represented by Structural formula 1 is too low, it is difficult to produce a good synergistic effect. When the amount of vinylene carbonate or any one of the compounds represented by Structural formula 1 is too much, it would not only increase the impedance due to the thick film formation, but also significantly increase the viscosity of the electrolyte, which would affect the battery performance.

In some embodiments, the charging and discharging voltage range of the lithium iron phosphate battery is 2.0-3.8V.

In some embodiments, the number of the cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups that each of A, B and C independently contains is 1-5, and the total number of the cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups that A, B and C contain is 10 or less.

In some embodiments, A and C are each independently selected from a group represented by Structural formula 2:

Structural formula 2

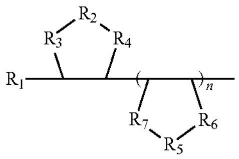

wherein n is an integer from 0 to 4, and $R_1$ is selected from hydrogen, halogen, a C1-C5 hydrocarbon group or halogenated hydrocarbon group; $R_2$, $R_3$, $R_4$, $R_5$, $R_6$ and $R_7$ are each independently selected from a C1-C3 hydrocarbylene group, a C1-C3 alkoxy group, oxygen atom,

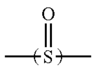, 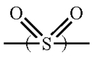 or 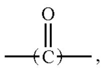, at least one of $R_2$, $R_3$ and $R_4$ is selected from

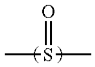, 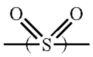 or 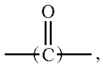, at least one of $R_2$, $R_3$ and $R_4$ is selected from oxygen atom, at least one of $R_5$, $R_6$ and $R_7$ is selected from

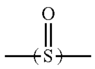, 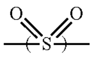 or 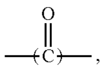, and at least one of $R_5$, $R_6$ and $R_7$ is selected from oxygen atom.

In a preferred embodiment, the combined group of $-R_3-R_2-R_4-$ and the combined group of $-R_7-R_5-R_6-$ are each independently selected from

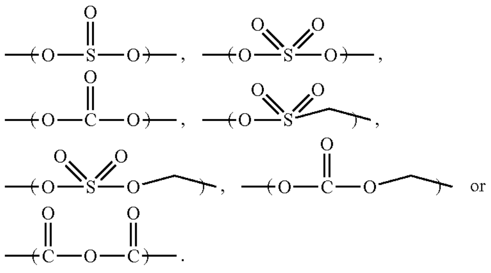

In some embodiments, B is selected from a group represented by Structural formula 3:

Structural formula 3

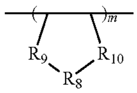

wherein m is an integer from 1 to 4, $R_8$, $R_9$ and $R_{10}$ are each independently selected from a C1-C3 hydrocarbylene group, a C1-C3 alkoxy group, oxygen atom,

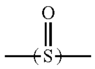, 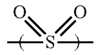 or 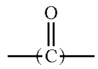, at least one of $R_8$, $R_9$ and $R_{10}$ is selected from

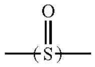, 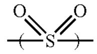 or 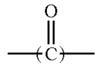, and at least one of $R_8$, $R_9$ and $R_{10}$ is selected from oxygen atom.

In a preferred embodiment, the combined group of $-R_9-R_8-R_{10}-$ are each independently selected from

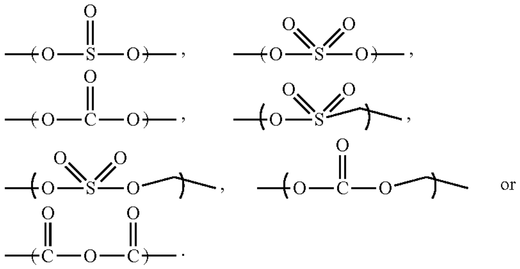

In some embodiments, D and E are each independently selected from a group represented by Structural formula 4:

Structural formula 4

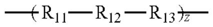

wherein z is an integer from 0 to 4, $R_{11}$ and $R_{13}$ are each independently selected from a single bond or a C1-C5 hydrocarbylene group, and $R_{12}$ is selected from a single bond,

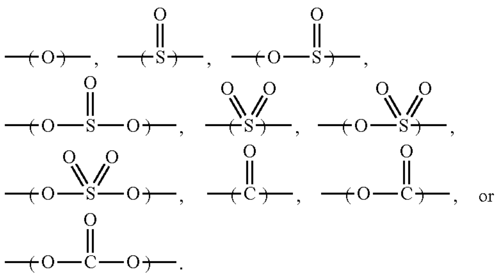

In some embodiments, A and C are the same, A and B are the same or different, and D and E are the same.

When A and C are the same, and D and E are the same, the compound represented by Structural formula 1 is symmetrical. Compared with asymmetric structure, the compound represented by Structural formula 1 with symmetrical structure is more likely to be synthesized, and the product yield is higher, which is beneficial to reducing the production cost.

In some embodiments, D and E are independently selected from single bonds or C1-C5 hydrocarbylene groups, and A, B and C are independently selected from substituted or unsubstituted cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups. Preferably, when A, B or C are substituted, the substituents are selected from halogen, hydrocarbon groups or cyclic anhydride groups.

As examples, the compound represented by Structural formula 1 may be selected from one or more of the following compounds:

Compound 1

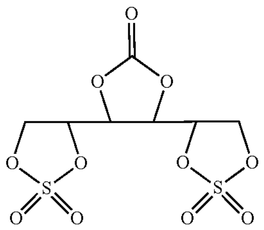

Compound 2

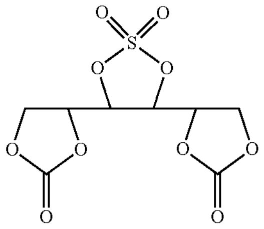

Compound 3

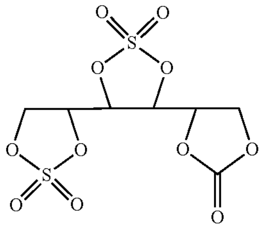

Compound 4

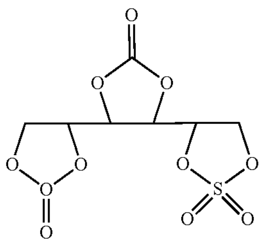

-continued

Compound 5

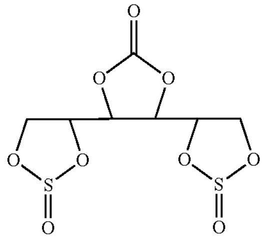

Compound 6

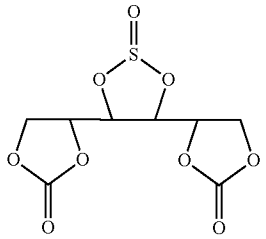

Compound 7

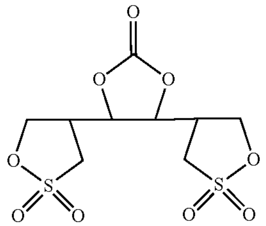

Compound 8

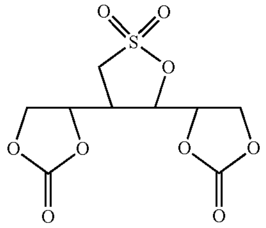

Compound 9

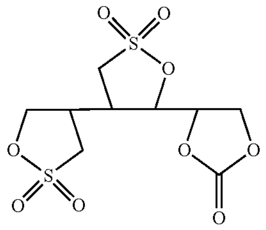

Compound 10

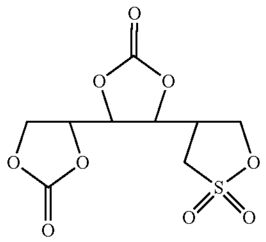

-continued
Compound 11
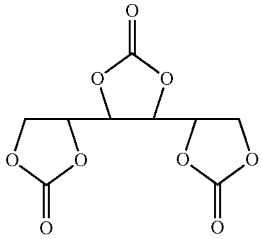
Compound 12
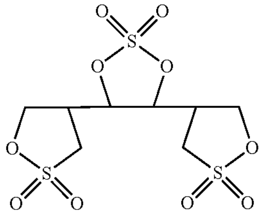
Compound 13
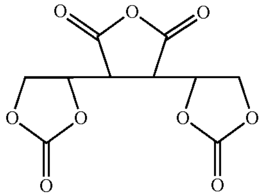
Compound 14
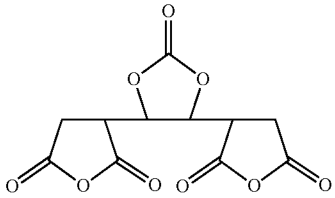
Compound 15
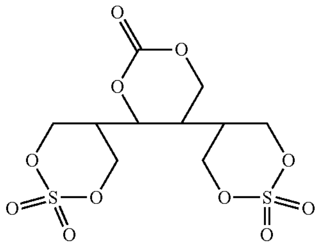
Compound 16
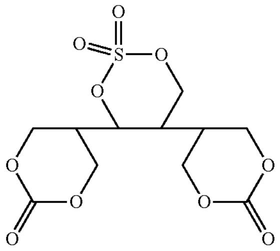
Compound 17
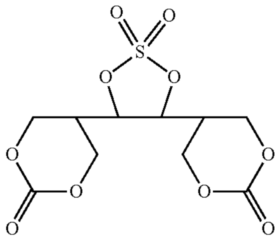
-continued
Compound 18
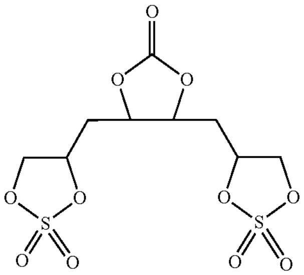
Compound 27
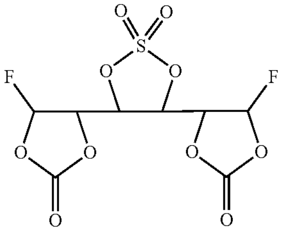
Compound 28
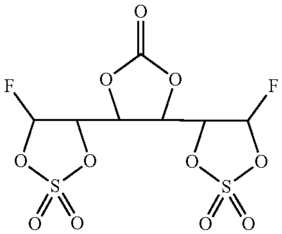
Compound 29
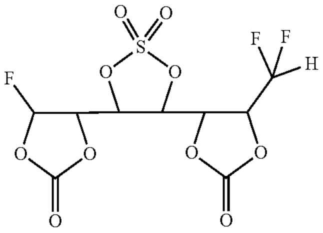
Compound 30
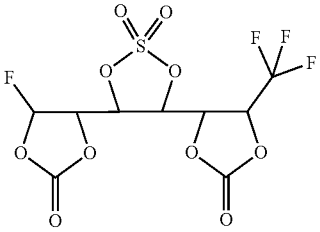
Compound 31
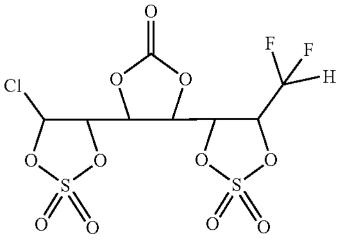

-continued

Compound 32

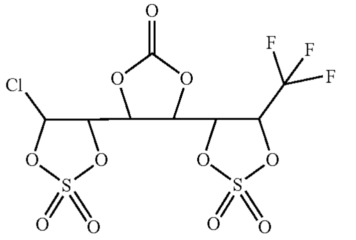

Compound 37

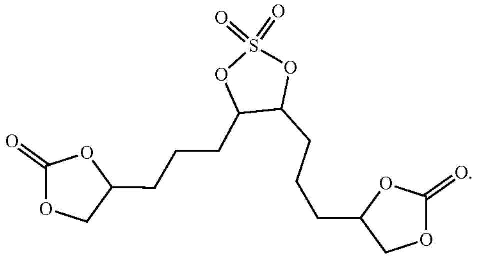

In some embodiments, D and E are each independently selected from a group represented by Structural formula 4:

Structural formula 4

$$-(R_{11}-R_{12}-R_{13})_z-$$

wherein z is an integer from 0 to 4, $R_{11}$ and $R_{13}$ are each independently selected from a single bond or a C1-C5 hydrocarbylene group, and $R_{12}$ is selected from

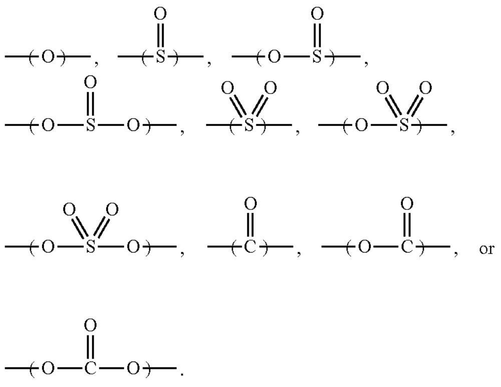

A, B and C are independently selected from substituted or unsubstituted cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups. Preferably, when A, B or C are substituted, the substituents are selected from halogen, hydrocarbon groups or cyclic anhydride groups.

As examples, the compound represented by Structural formula 1 may be selected from one or more of the following compounds:

Compound 19

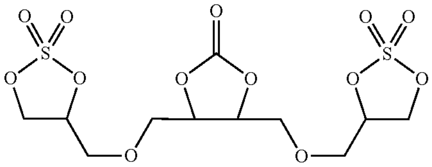

Compound 20

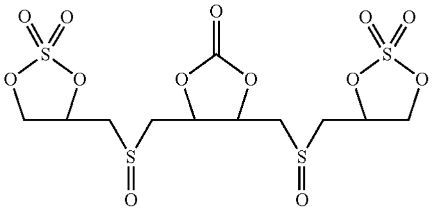

Compound 21

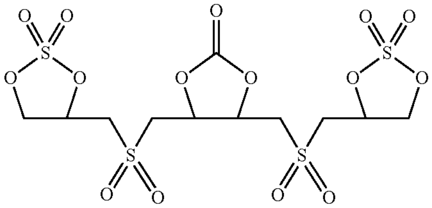

Compound 22

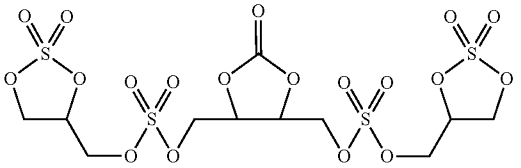

Compound 23

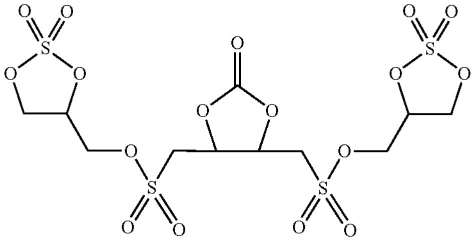

Compound 24

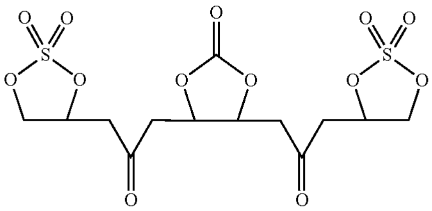

Compound 25

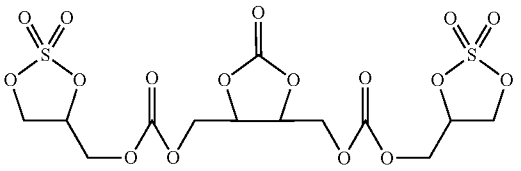

-continued

Compound 26

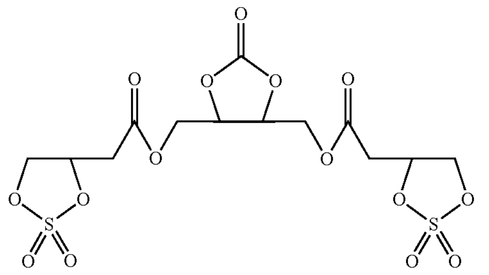

Compound 33

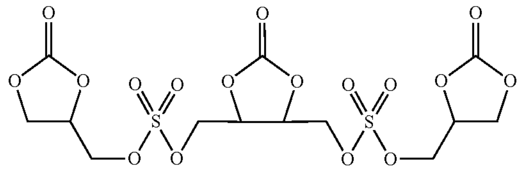

Compound 34

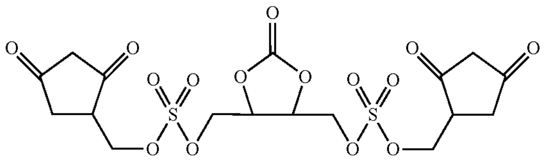

Compound 40

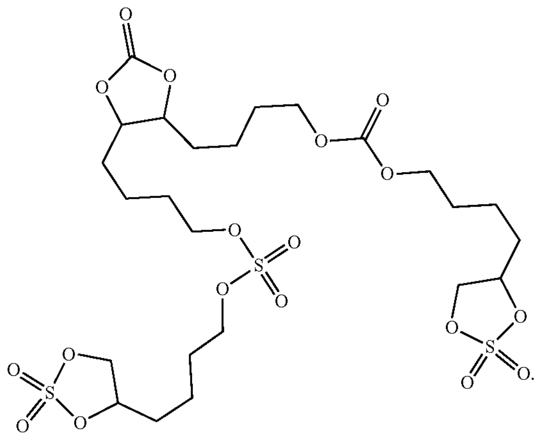

In some embodiments, the compound represented by Structural formula 1 may also be selected from one or more of the following compounds:

Compound 35

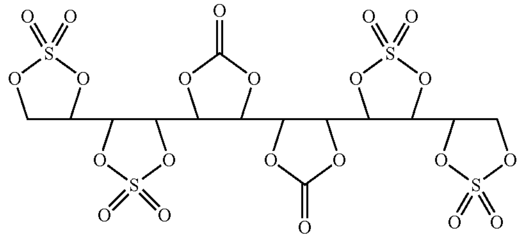

-continued

Compound 36

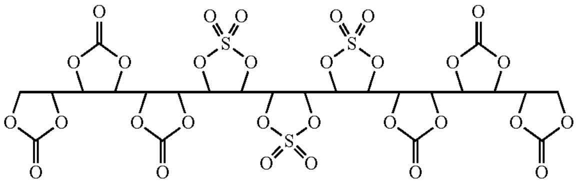

Compound 38

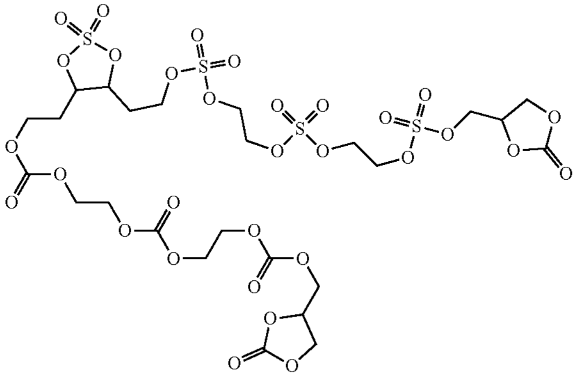

Compound 39

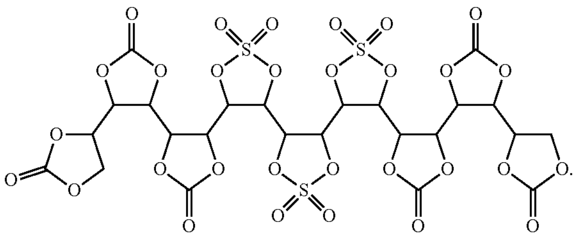

It should be noted that the above are some of the compounds claimed by the present application, but they are not limited to this, and should not be understood as limitations to the present application.

Those skilled in the art can know the preparation method of the above compounds according to the common knowledge in the field of chemical synthesis when they are aware of the structural formula of the compound represented by Structural formula 1. For example:

Compound 1 may be prepared according to the following method.

Put organic solvents such as sorbitol, dimethyl carbonate, methanol alkaline catalyst potassium hydroxide and DMF into a reaction container, allow them to react for several hours under heating conditions, add a certain amount of oxalic acid to adjust the pH value to be neutral, then filter and recrystallize to obtain an intermediate product 1, and then perform esterification reaction on the intermediate product 1, carbonate, thionyl chloride and the like under high temperature conditions to obtain an intermediate product 2, and oxidize the intermediate product 2 by using an oxidant such as sodium periodate and the like to obtain Compound 1.

Compound 2 may be prepared according to the following method.

After diacetone-D-mannitol, dimethyl carbonate, methanol, potassium carbonate and dioxane are heated and stirred to react for several hours. Add a certain amount of oxalic acid to adjust the pH of the solution to neutrality, and an intermediate product 3 is obtained after filtration and concentration. Add proper amount of pure water, carbonate, acid, etc. into the intermediate product 3 for hydrolysis reaction to obtain an intermediate product 4. Then heat the intermediate product 4, thionyl dichloride and carbonate solvent to prepare an intermediate product 5. Finally, oxidize the intermediate product 5 by using oxidant such as sodium periodate to obtain Compound 2.

In some embodiments, the solvent includes one or more of ether solvent, nitrile solvent, carbonate solvent and carboxylate solvent. In some embodiments, the solvent includes one or more of ether solvent, nitrile solvent, carbonate solvent and carboxylic acid solvent.

The ether solvent includes cyclic ether or chain ether.

Examples of cyclic ether may be 1,3-dioxolane (DOL), 1,4-dioxooxane (DX), crown ether, tetrahydrofuran (THF), 2-methyltetrahydrofuran (2-CH3-THF) and 2-trifluoromethyltetrahydrofuran (2-CF3-THF).

Examples of chain ether include one or more of dimethoxymethane (DMM), 1,2-dimethoxyethane (DME) and diethylene glycol dimethyl ether (TEGDME).

In some embodiments, the nitrile solvent may be but not limited to one or more of acetonitrile, glutaronitrile and malononitrile.

In some embodiments, the carbonate solvent includes cyclic carbonate or chain carbonate.

The cyclic carbonate may be one or more of ethylene carbonate (EC), propylene carbonate (PC), γ-butyrolactone (GBL) and butylene carbonate (BC).

The chain carbonate may be one or more of dimethyl carbonate (DMC), ethyl methyl carbonate (EMC), diethyl carbonate (DEC), methyl n-propyl carbonate, ethyl n-propyl carbonate and dipropyl carbonate (DPC).

Carboxylic acid solvent includes cyclic carboxylic ester or chain carbonic ester. Examples of cyclic carboxylic ester include one or more of γ-butyrolactone, γ-valerolactone and δ-valerolactone.

Examples of chain carbonic ester include one or more of methyl acetate (MA), ethyl acetate (EA), n-propyl acetate (EP), butyl acetate, propyl propionate (PP) and butyl propionate. And the carboxylate solvent comprises cyclic carboxylate or chain carbonate.

In some embodiments, the electrolyte salt is selected from lithium salts. In a preferred embodiment, the electrolyte salt is selected from one or more of $LiPF_6$, $LiBF_4$, LiBOB, LiDFOB, $LiN(SO_2CF_3)_2$, $LiN(SO_2C_2F_5)_2$, $LiC(SO_2CF_3)_3$, $LiN(SO_2F)_2$, $LiClO_4$, $LiAsF_6$, $LiSbF_6$, $LiCF_3SO_3$, $Li_2B_{10}Cl_{10}$, lithium salt of lower aliphatic carboxylic acid, $LiAlCl_4$, LiDFOP and $LiPO_2F_2$. In a more preferred embodiment, the electrolyte salt is selected from one or more of $LiPF_6$, $LiPO_2F_2$ and LiFSI.

In some embodiments, the concentration of the electrolyte salt in the non-aqueous electrolyte is 0.1 mol/L-8 mol/L. In a preferred embodiment, the concentration of the electrolyte salt in the non-aqueous electrolyte is 0.5 mol/L-4 mol/L. Specifically, the concentration of the electrolyte salt may be 0.5 mol/L, 1 mol/L, 1.5 mol/L, 2 mol/L, 2.5 mol/L, 3 mol/L, 3.5 mol/L or 4 mol/L.

In some embodiments, the non-aqueous electrolyte also includes a supplemental additive. The supplemental additive includes at least one of a fluorinated cyclic carbonate compound, sulfonic acid lactone compound, aromatic additive, fluorine-containing anisole compound, dicarboxylic anhydride, lithium difluorophosphate, ethylene sulfate (DTD), lithium difluorosulfomide (LiFSI), methylene methyl disulfonate, tri (trimethylsilane) phosphate, and tri (trimethylsilane) borate.

In some embodiments, the fluorinated cyclic carbonate compound includes one of more of fluoroethylene carbonate (FEC), 4,4-difluoroethylene carbonate, 4,5-difluoroethylene carbonate, 4-fluoro-4-methyl ethylene carbonate, 4,5-difluoro-4-methyl ethylene carbonate, 4-fluoro-5-methyl ethylene carbonate, 4,4-difluoro-5-methyl ethylene carbonate, 4-(fluoromethyl) ethylene carbonate, 4-(difluoromethyl) ethylene carbonate, 4-(trifluoromethyl) ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate and 4,4-difluoro-5,5-dimethylethylene carbonate.

When the non-aqueous electrolyte contains fluorinated cyclic carbonate compound, the content of the fluorinated cyclic carbonate compound is 0.1-30% based on the total mass of the non-aqueous electrolyte being 100%.

In some embodiments, the sultone compound is selected from one or more of 1,3-propane sultone (1,3-PS), 1,4-butane sultone (1,4-BS), and 1,3-propene sultone (PST).

When the non-aqueous electrolyte contains sulfonic acid lactone compound, the content of sultone compound is 0.1-5% based on the total mass of the non-aqueous electrolyte for lithium ion battery being 100%.

In some embodiments, the aromatic additive includes one or more of aromatic compounds such as biphenyl, alkyl biphenyl, terphenyl, partial hydride of terphenyl, cyclohexylbenzene, tert-butyl benzene, tert-amyl benzene, diphenyl ether, diphenylene-oxide, etc, or 2-fluorobiphenyl, o-cyclohexyl fluorobenzene and p-cyclohexyl fluorobenzene.

When the non-aqueous electrolyte contains aromatic additive, the mass percentage of the aromatic additive is 0.1-5% based on the total mass of the non-aqueous electrolyte being 100%.

In some embodiments, the fluorine-containing anisole compound includes one or more of 2,4-difluoranisole, 2,5-difluoranisole, and 2,6-difluoranisole.

When the non-aqueous electrolyte contains a fluorine-containing anisole compound, the mass percentage of the fluorine-containing anisole compound is 0.1-5% based on the total mass of the non-aqueous electrolyte being 100%.

In some embodiments, the dicarboxylic anhydride comprises one or more of succinic acid, maleic acid and phthalic acid.

When the non-aqueous electrolyte contains dicarboxylic anhydride, the content of dicarboxylic anhydride is 0.1-5% based on the total mass of the non-aqueous electrolyte being 100%.

In some embodiments, when the non-aqueous electrolyte contains lithium difluorophosphate, the mass percentage of the lithium difluorophosphate is 0.1-2% based on the total mass of the non-aqueous electrolyte being 100%.

In some embodiments, when the non-aqueous electrolyte contains ethylene sulfate (DTD), the mass percentage of the ethylene sulfate (DTD) is 0.1-5% based the total mass of the non-aqueous electrolyte being 100%.

In some embodiments, when the non-aqueous electrolyte contains lithium bis (fluorosulfonyl) imide (LiFSI), the mass percentage of the lithium bis (fluorosulfonyl) imide (LiFSI) is 0.1-5% based on the total mass of the non-aqueous electrolyte being 100%.

In some embodiments, the supplementary additive also includes a nitrogen-containing compound such as 1-methyl-2-pyrrolidone, 1-methyl-2-piperidone, 3-methyl-2-oxazolidinone, 1,3-dimethyl-2-imidazolidinone, N-methyl succinimide, etc; or a hydrocarbon compound such as heptane, octane and cycloheptane; or a fluorine-containing aromatic compound such as fluorobenzene, difluorobenzene and trifluoromethyl.

It should be noted that, unless otherwise specified, in general, the mass percentage content of any optional substance for the supplementary additives in the non-aqueous electrolyte is below 10%, and preferably, the mass percentage content is 0.1-5%.

In a preferred embodiment, the supplementary additive is selected from one or more of 1,3-propane sultone, methylene methyl disulfonate, fluoroethylene carbonate and ethylene sulfate.

In some embodiments, the positive electrode further includes a positive electrode current collector, and the positive electrode material layer covers the surface of the positive electrode current collector. The positive electrode current collector is selected from metal materials that can conduct electrons. Preferably, the positive electrode current collector includes one or more of Al, Ni and stainless steel. In a more preferred embodiment, the positive electrode current collector is selected from aluminum foil.

In some embodiments, the positive electrode material layer further comprises a positive electrode binder and a positive electrode conductive agent. The positive electrode active material, positive electrode binder and positive electrode conductive agent are blended to obtain the positive electrode material layer.

The positive electrode binder includes one or more of polyvinylidene fluoride, vinylidene fluoride copolymer, polytetrafluoroethylene, vinylidene fluoride-hexafluoropropylene copolymer, tetrafluoroethylene-hexafluoropropylene copolymer, tetrafluoroethylene-perfluoroalkyl vinyl ether copolymer, ethylene-tetrafluoroethylene copolymer, vinylidene fluoride-tetrafluoroethylene copolymer, vinylidene fluoride-trifluoroethylene copolymer, vinylidene fluoride-trichloroethylene copolymer, vinylidene fluoride-fluoroethylene copolymer, vinylidene fluoride-hexafluoropropylene-tetrafluoroethylene copolymer, thermoplastic polyimide, polyethylene, polypropylene or other thermoplastic resins; and styrene butadiene rubber.

The positive electrode conductive agent comprises one or more of conductive carbon black, conductive carbon sphere, conductive graphite, conductive carbon fiber, carbon nanotubes, graphene or reduced graphene oxide.

In some embodiments, the negative electrode includes a negative electrode material layer. The negative electrode material layer comprises a negative electrode active material. The negative electrode active material includes one or more of a silicon-based negative electrode, a carbon-based negative electrode, a tin-based negative electrode, and a lithium negative electrode. Wherein the silicon-based negative electrode comprises one or more of silicon material, silicon oxide, silicon-carbon composite material and silicon alloy material. The carbon-based negative electrode comprises one or more of graphite, hard carbon, soft carbon, graphene and mesocarbon microbead. The tin-based negative electrode comprises one or more of tin, tin carbon, tin oxide and tin metal compounds. The lithium negative electrode comprises one or more of metal lithium or lithium alloy. Specifically, the lithium alloy may be at least one of lithium silicon alloy, lithium sodium alloy, lithium potassium alloy, lithium aluminum alloy, lithium tin alloy and lithium indium alloy.

In a preferred embodiment, the negative electrode active material is selected from one or more of artificial graphite, natural graphite and silicon carbide. In some embodiments, the negative electrode further comprises a negative electrode current collector, and the negative electrode material layer covers the surface of the negative electrode current collector. The negative electrode current collector is selected from a metal material that can conduct electrons. Preferably, the negative electrode current collector includes one or more of Cu, Ni and stainless steel. In a more preferred embodiment, the negative electrode current collector is selected from copper foil.

In some embodiments, the negative electrode material layer further comprises a negative electrode binder and a negative electrode conductive agent. And the negative electrode active material, negative electrode binder and negative electrode conductive agent are blended to obtain the negative electrode material layer.

The negative electrode binder includes one or more of polyvinylidene fluoride, vinylidene fluoride copolymer, polytetrafluoroethylene, vinylidene fluoride-hexafluoropropylene copolymer, tetrafluoroethylene-hexafluoropropylene copolymer, tetrafluoroethylene-perfluoroalkyl vinyl ether copolymer, ethylene-tetrafluoroethylene copolymer, vinylidene fluoride-tetrafluoroethylene copolymer, vinylidene fluoride-trifluoroethylene copolymer, vinylidene fluoride-trichloroethylene copolymer, vinylidene fluoride-fluoroethylene copolymer, vinylidene fluoride-hexafluoropropylene-tetrafluoroethylene copolymer, thermoplastic polyimide, polyethylene, polypropylene or other thermoplastic resins; and styrene butadiene rubber.

The negative electrode conductive agent comprises one or more of conductive carbon black, conductive carbon sphere, conductive graphite, conductive carbon fiber, carbon nanotube, graphene or reduced graphene oxide.

In some embodiments, the battery further comprises a diaphragm, and the diaphragm is positioned between the positive electrode and negative electrode. The diaphragm may be an existing conventional diaphragm, and may be a ceramic diaphragm, a polymer diaphragm, a nonwoven fabric, an inorganic-organic composite diaphragm, etc., including but not limited to single-layer PP (polypropylene), single-layer PE (polyethylene), double-layer PP/PE, double-layer PP/PP and triple-layer PP/PE/PP diaphragms.

The present application will be further illustrated with the embodiments below.

I. Embodiments 1 to 29 and Comparative Examples 1 to 13

1) Preparation of Electrolyte

Ethylene carbonate (EC) and ethyl methyl carbonate (EMC) were mixed according to the mass ratio of EC:EMC=3:7, then lithium hexafluorophosphate ($LiPF_6$) was added until the molar concentration was 1 mol/L, and then each of the additives was added according to the following tables. The content of the additive is calculated as a percentage of the total mass of the electrolyte.

2) Preparation of Positive Plate

Positive electrode active material of lithium iron phosphate, conductive carbon black Super-P and positive electrode binder of polyvinylidene fluoride (PVDF) were mixed according to the mass ratio of 93:4:3, and then the mixture was dispersed in N-methyl-2-pyrrolidone (NMP) to obtain a positive electrode slurry. The slurry was evenly coated on both sides of an aluminum foil, dried, calendered and vacuum-dried, and an aluminum lead wire was welded by an ultrasonic welding machine to obtain a positive electrode plate with a thickness of 120-150 μm. The compacted density of the positive electrode material layer is shown in the following tables.

3) Preparation of Negative Plate

Negative electrode active material of modified natural graphite, conductive carbon black Super-P, binder styrene-butadiene rubber (SBR) and carboxymethyl cellulose (CMC) were mixed according to the mass ratio of 94:1:2.5: 2.5, and then the mixture were dispersed in deionized water to obtain a negative electrode slurry. The slurry was coated on both sides of the copper foil, dried and rolled, and a nickel lead wire was welded by an ultrasonic welding machine to obtain a negative electrode plate. The porosity of each test group and control group after rolling is shown in Table 1.

4) Preparation of Battery Core

A polyethylene microporous membrane with a thickness of 20 μm was placed between the positive electrode plate and the negative electrode plate as a diaphragm. And then the sandwich structure composed of the positive electrode plate, negative electrode plate and separator was wound. Then the winding body was flattened and put into an aluminum-plastic film. After the wires of the positive and negative electrodes were led out respectively, the aluminum-plastic film was sealed by heat sealing to obtain a battery core to be injected with liquid.

5) Injection and Formation of Battery Core

In a glove box with dew point controlled below −40° C., the prepared electrolyte was injected into the battery core through the liquid injection hole, and the amount of electrolyte should be ensured to fill the gap in the battery core. Then it was formed according to the following steps: charged at 0.05 C constant current for 180 min, charged at 0.1 C constant current for 180 min, shaped and sealed after standing for 24 hr. Then further charged at 0.2 C to 3.65V, and discharged at 0.2 C constant current to 2.0V after standing at room temperature for 24 hr.

2. Performance Tests

The lithium ion batteries prepared in Embodiments 1 to 29 and Comparative examples 1 to 13 were tested for the following performances:

High-Temperature Cycle Performance Test

1) Under the condition of 45° C., charged it to 3.65V at 1 C constant current, then charged it at a constant voltage until the current dropped to 0.1 C, then discharged it at 1 C constant current to 2.0V. This step was repeated for 1000 times, recorded the discharge capacity of the first cycle and the discharge capacity of the 1000th cycle, and calculated the capacity retention rate according to the following formula.

Capacity retention rate=(Discharge capacity of the 1000th cycle÷Discharge capacity of the first cycle)×100%

2) Storage Test at 60° C. Under Fully-Charged State at 3.65V

At room temperature, the battery was charged to 3.65V at 0.5 C, and the cut-off current was 0.02 C. After standing for 5 minutes, discharged at 0.5 C to 2.0V, and the initial capacity D1 was recorded. Then it was charged to 3.65V at 0.5 C constant current and constant voltage, and the cut-off current was 0.02 C. The thickness T1, voltage and internal resistance of the battery were tested. After the fully charged battery was stored at 60° C. in a thermostat for 30 days, the thermal thickness T2 of the battery was measured. After being left at room temperature for 4 hours, the cold thickness T3, voltage and internal resistance of the battery were measured. Then, it was discharged to 2.0V at 0.5 C, the retention capacity D2 was recorded. After being left for 5 minutes, it was charged to 3.65V at constant current and constant voltage with a cut-off current of 0.02 C. After being left for 5 minutes, it was discharged to 2.0V at 0.5 C, the recovery capacity was record.

Battery capacity retention rate (%)=$D2/D1$*100%;

Battery capacity recovery rate (%)=$D3/D1$*100%

3) Iron Ion Dissolution Test

The recycled battery was disassembled, the negative electrode and negative electrode side diaphragm of the battery were taken out, which were dissolved in the mixed solution of water: concentrated nitric acid=2:1 (mass ratio). After complete digestion, 20 g digestion solution was divided into 50 ml reagent bottles, and then the amount of iron ions dissolved on the negative electrode and diaphragm was measured by inductively coupled plasma emission spectrometer (ICP-OES).

1. The test results obtained from Embodiments 1-12 and Comparative examples 1-2 are shown in Table 1.

TABLE 1

| Group | Compacted density of positive electrode $LiFePO_4$ (g/cm$^3$) | Compound represented by Structure formula (1) and its content (%) | Other additives and contents (%) | High-temperature cycle performance Cycle for 1000 times at 45° C. 1 C/1 C. Capacity retention rate (%) | High-temperature storage performance (Storage at 60° C. for 30 days) Capacity retention rate (%) | Capacity recovery rate (%) | Fe ion dissolution test results/ ppm |
|---|---|---|---|---|---|---|---|
| Embodiment 1 | 2.5 | Compound 1: 0.01 | VC: 2 | 83.8 | 84.0 | 86.3 | 26.0 |
| Embodiment 2 | 2.5 | Compound 1: 0.05 | VC: 2 | 85.0 | 85.1 | 87.4 | 23.1 |
| Embodiment 3 | 2.5 | Compound 1: 0.1 | VC: 2 | 87.1 | 87.5 | 89.7 | 18.5 |
| Embodiment 4 | 2.5 | Compound 1: 0.3 | VC: 2 | 89.5 | 90.1 | 92.5 | 10.6 |
| Embodiment 5 | 2.5 | Compound 1: 0.5 | VC: 2 | 91.5 | 93.1 | 95.4 | 8.1 |
| Embodiment 6 | 2.5 | Compound 1: 1 | VC: 2 | 89.9 | 90.8 | 93.1 | 10.2 |
| Embodiment 7 | 2.5 | Compound 1: 3 | VC: 2 | 88.7 | 89.5 | 91.7 | 11.4 |
| Embodiment 8 | 2.5 | Compound 1: 5 | VC: 2 | 88.0 | 88.0 | 90.4 | 13.9 |
| Embodiment 9 | 2.5 | Compound 1: 0.5 | VC: 0.5 | 88.4 | 89.1 | 91.3 | 12.0 |
| Embodiment 10 | 2.5 | Compound 1: 0.5 | VC: 1 | 90.4 | 92.1 | 94.3 | 9.3 |

TABLE 1-continued

| Group | Compacted density of positive electrode $LiFePO_4$ (g/cm$^3$) | Compound represented by Structure formula (1) and its content (%) | Other additives and contents (%) | High-temperature cycle performance Cycle for 1000 times at 45° C. 1 C/1 C. Capacity retention rate (%) | High-temperature storage performance (Storage at 60° C. for 30 days) Capacity retention rate (%) | Capacity recovery rate (%) | Fe ion dissolution test results/ppm |
|---|---|---|---|---|---|---|---|
| Embodiment 11 | 2.5 | Compound 1: 0.5 | VC: 3 | 89.2 | 90.3 | 92.7 | 10.5 |
| Embodiment 12 | 2.5 | Compound 1: 0.5 | VC: 5 | 85.1 | 86.1 | 88.5 | 20.4 |
| Comparative example 1 | 2.5 | — | VC: 2 | 80.1 | 81.2 | 83.6 | 33.5 |
| Comparative example 2 | 2.5 | Compound 1: 0.5 | — | 70.3 | 71.2 | 73.6 | 88.5 |

As can be seen from the test data of Embodiments 1-12 and Comparative examples 1 and 2, for the high-compacted-density lithium iron phosphate battery (2.5 g/cm3), compared with adding vinylene carbonate (VC) or the compound represented by Structural formula 1 alone in the electrolyte, adding both vinylene carbonate (VC) and the compound represented by Structural formula 1 can obviously improve the high-temperature cycle at 45° C. and the high-temperature storage performance at 60° C., and effectively inhibit the dissolution of iron ions. That is, the additive combination provided by the invention can obviously improve the high-temperature cycle and storage performance of the high-compacted-density lithium iron phosphate battery.

From the test data of Embodiments 1-8, it can be seen that in the non-aqueous electrolyte with 2% VC, with the increase of the content of the compound represented by Structural formula 1, the performance of "Cycle for 1000 times at 45° C. 1 C/1 C" and "Storage at 60° C. for 30 days" first become better and then deteriorate. When the amount of the compound represented by Structural formula 1 is 0.5% in the non-aqueous electrolyte, it can have a good synergistic effect with 2% VC, which can effectively improve the overall performance of the battery. When the content is more than 0.5%, the residual amount of the compound in the positive electrode plate would also increase, and excessive compound represented by Structural formula 1 would increase the internal side reaction of the battery and increase the battery impedance, which is not conducive to the further improvement of the battery performance. When the content is less than 0.5%, the interface film formed on the negative electrode is not stable enough, and the performance of lithium iron phosphate battery is not obviously improved.

According to the test data of Embodiments 5 and 9-12, on the basis of the above-determined addition amount of 0.5% for the compound represented by Structural formula 1, the high-temperature cycle performance of lithium-ion batteries first improve and then decrease with the increase of the addition amount of vinylene carbonate (VC). Especially, when the addition amount of vinylene carbonate (VC) is 2%, it has the best synergistic effect with the compound represented by Structural formula 1. If the amount of vinylene carbonate (VC) is too low, the film formation would be unstable, and the high-temperature cycle performance of lithium iron phosphate battery would not be improved obviously. If the content of vinylene carbonate (VC) is too high, the addition of the compound represented by Structural formula 1 can not inhibit the thickening of the interface film caused by the increase of VC content, and the performance of lithium iron phosphate battery would deteriorate.

2. Test results of Embodiments 5, 13-16 and Comparative examples 1, 3-11 are shown in Table 2

TABLE 2

| Group | Compacted density of positive electrode $LiFePO_4$ (g/cm$^3$) | Compound represented by Structure formula (1) and its content (%) | Other additives and contents (%) | High-temperature cycle performance Cycle for 1000 times at 45° C. 1 C/1 C. Capacity retention rate (%) | High-temperature storage performance (Storage at 60° C. for 30 days) Capacity retention rate (%) | Capacity recovery rate (%) | Fe ion dissolution test results/ppm |
|---|---|---|---|---|---|---|---|
| Embodiment 5 | 2.5 | Compound 1: 0.5 | VC: 2 | 91.5 | 93.1 | 95.4 | 8.1 |
| Embodiment 13 | 2.4 | Compound 1: 0.5 | VC: 2 | 91.1 | 92.8 | 95.0 | 8.6 |
| Embodiment 14 | 2.3 | Compound 1: 0.5 | VC: 2 | 90.7 | 92.3 | 94.6 | 9.0 |
| Embodiment 15 | 2.7 | Compound 1: 0.5 | VC: 2 | 90.0 | 91.2 | 93.5 | 10.0 |
| Embodiment 16 | 2.8 | Compound 1: 0.5 | VC: 2 | 89.5 | 90.6 | 92.9 | 10.5 |
| Comparative example 1 | 2.5 | — | VC: 2 | 80.1 | 81.2 | 83.6 | 33.5 |
| Comparative example 3 | 2.2 | Compound 1: 0.5 | VC: 2 | 83.2 | 84.1 | 86.4 | 25.7 |

TABLE 2-continued

| Group | Compacted density of positive electrode $LiFePO_4$ ($g/cm^3$) | Compound represented by Structure formula (1) and its content (%) | Other additives and contents (%) | High-temperature cycle performance Cycle for 1000 times at 45° C. 1 C/1 C. Capacity retention rate (%) | High-temperature storage performance (Storage at 60° C. for 30 days) Capacity retention rate (%) | Capacity recovery rate (%) | Fe ion dissolution test results/ppm |
|---|---|---|---|---|---|---|---|
| Comparative example 4 | 2.0 | Compound 1: 0.5 | VC: 2 | 84.8 | 85.2 | 87.6 | 22.8 |
| Comparative example 5 | 1.8 | Compound 1: 0.5 | VC: 2 | 85.6 | 86.5 | 88.9 | 20.0 |
| Comparative example 6 | 2.2 | — | VC: 2 | 81.0 | 82.0 | 84.2 | 32.6 |
| Comparative example 7 | 2.0 | — | VC: 2 | 81.6 | 82.5 | 84.8 | 32.1 |
| Comparative example 8 | 1.8 | — | VC: 2 | 82.1 | 83.1 | 85.5 | 31.5 |
| Comparative example 9 | 2.3 | — | VC: 2 | 80.5 | 81.6 | 84.0 | 33.1 |
| Comparative example 10 | 2.7 | — | VC: 2 | 78.2 | 79.0 | 81.4 | 75.2 |
| Comparative example 11 | 2.8 | — | VC: 2 | 76.5 | 77.1 | 79.5 | 79.0 |

From the test results of Embodiments 5, 13-16 and Comparative examples 1, 3-11, it can be seen that adding the compound represented by Structural formula 1 to the electrolyte containing vinylene carbonate (VC) has obvious improvement effect on the high-temperature storage and cycle performance of high-compacted-density (2.3-2.8 $g/cm^3$) lithium iron phosphate batteries. Although it can improve the high-temperature storage and cycle performance of low-compacted--density lithium iron phosphate battery (1.8-2.3 $g/cm^3$), the improvement effect is not obvious. That is, the compound represented by Structural formula 1 has a more significant effect on the high-temperature storage and cycle performance of high-compacted-density lithium iron phosphate battery (2.3-2.8 $g/cm^3$). The experimental results show that the compound represented by structural formula 1 and VC jointly form an interface film on the electrode surface, which improves the migration rate of lithium ions in high-compacted-density lithium iron phosphate battery during high-temperature cycle, reduces the redox reaction between electrolyte solvent and electrode materials, inhibits the generation of lithium dendrites at the negative electrode interface, and ultimately improves the high-temperature cycle and high-temperature storage performance of lithium iron phosphate battery.

3. The test results of Embodiments 5, 17-27 and Comparative examples 1-2 are shown in Table 3.

TABLE 3

| Group | Compacted density of positive electrode of $LiFePO_4$ ($g/cm^3$) | Compound represented by Structure formula (1) and its content (%) | Other additives and contents (%) | High-temperature cycle performance Cycle for 1000 times at 45° C. 1 C/1 C. Capacity retention rate (%) | High-temperature storage performance (Storage at 60° C. for 30 days) Capacity retention rate (%) | Capacity recovery rate (%) | Fe ion dissolution test results/ppm |
|---|---|---|---|---|---|---|---|
| Embodiment 5 | 2.5 | Compound 1: 0.5 | VC: 2 | 91.5 | 93.1 | 95.4 | 8.1 |
| Embodiment 17 | 2.5 | Compound 2: 0.5 | VC: 2 | 90.5 | 92.1 | 94.3 | 9.2 |
| Embodiment 18 | 2.5 | Compound 5: 0.5 | VC: 2 | 90.8 | 92.4 | 94.7 | 8.8 |
| Embodiment 19 | 2.5 | Compound 8: 0.5 | VC: 2 | 90.2 | 91.9 | 94.1 | 9.5 |
| Embodiment 20 | 2.5 | Compound 12: 0.5 | VC: 2 | 90.9 | 92.6 | 94.9 | 8.7 |
| Embodiment 21 | 2.5 | Compound 15: 0.5 | VC: 2 | 90.3 | 92.0 | 94.2 | 9.4 |
| Embodiment 22 | 2.5 | Compound 18: 0.5 | VC: 2 | 90.9 | 92.6 | 94.9 | 8.7 |
| Embodiment 23 | 2.5 | Compound 22: 0.5 | VC: 2 | 91.2 | 92.8 | 95.1 | 8.4 |
| Embodiment 24 | 2.5 | Compound 26: 0.5 | VC: 2 | 90.8 | 92.5 | 94.9 | 8.7 |
| Embodiment 25 | 2.5 | Compound 30: 0.5 | VC: 2 | 91.0 | 92.7 | 94.9 | 8.5 |
| Embodiment 26 | 2.5 | Compound 35: 0.5 | VC: 2 | 90.3 | 92.1 | 94.4 | 9.3 |
| Embodiment 27 | 2.5 | Compound 40: 0.5 | VC: 2 | 90.4 | 92.0 | 94.1 | 9.3 |
| Comparative example 1 | 2.5 | — | VC: 2 | 80.1 | 81.2 | 83.6 | 80.1 |
| Comparative example 2 | 2.5 | Compound 1: 0.5 | — | 70.3 | 71.2 | 73.6 | 88.5 |

By comparing the test data of Embodiments 5, 17-26 and Comparative examples 1-2, it can be seen that in the high-compacted-density lithium iron phosphate battery (2.5 $g/cm^3$), adding different compounds represented by Structural formula 1 into the electrolyte containing vinylene carbonate (VC) can improve the high-temperature cycle at 45° C. and the high-temperature storage performance at 60° C. to varying degrees, and effectively inhibit the dissolution of iron ions. It shows that the compound represented by Structural formula 1 has good compatibility with vinylene carbonate (VC) in the high-compacted-density lithium iron phosphate battery (2.5 $g/cm^3$). 4. The test results of Embodiments 5, 28-29 and Comparative examples 1 and 12-13 are shown in Table 4.

TABLE 4

| Group | Compacted density of positive electrode of $LiFePO_4$ ($g/cm^3$) | Compound represented by Structural formula (1) and its content (%) | Other additives and contents (%) | High-temperature cycle performance Cycle for 1000 times at 45° C. 1 C/1 C. Capacity retention rate (%) | High-temperature storage performance (Storage at 60° C. for 30 days) Capacity retention rate (%) | High-temperature storage performance (Storage at 60° C. for 30 days) Capacity recovery rate (%) | Fe ion dissolution test results/ppm |
|---|---|---|---|---|---|---|---|
| Embodiment 5 | 2.5 | Compound 1: 0.5 | VC: 2 | 91.5 | 93.1 | 95.4 | 8.1 |
| Embodiment 28 | 2.5 | Compound 1: 0.5 | VC: 2 + DTD: 0.5 | 92.8 | 94.3 | 96.7 | 7.0 |
| Embodiment 29 | 2.5 | Compound 1: 0.5 | VC: 2 +MMDS: 0.5 | 93.4 | 94.8 | 97.2 | 6.6 |
| Comparative example 1 | 2.5 | — | VC: 2 | 80.1 | 81.2 | 83.6 | 33.5 |
| Comparative example 12 | 2.5 | — | VC: 2 + DTD: 0.5 | 85.7 | 86.2 | 88.5 | 20.6 |
| Comparative example 13 | 2.5 | — | VC: 2 + MMDS: 0.5 | 86.2 | 86.8 | 89.2 | 19.5 |

From the test data of Embodiments 5, 28-29 and Comparative examples 1, 12-13, it can be seen that the high-temperature cycle performance and high-temperature storage performance of high-compacted-density lithium iron phosphate battery can be further improved by further adding ethylene sulfate (DTD) or methylene methyl disulfonate (MMDS) into the non-aqueous electrolyte system of vinylene carbonate (VC) and the compound represented by Structural formula 1.

Meanwhile, by comparing the test data of Embodiments 5 and Comparative examples 12-13, it can be seen that compared with adding ethylene sulfate (DTD) or methylene methyl disulfonate (MMDS) into the non-aqueous electrolyte of vinylene carbonate (VC), adding the compound represented by Structural formula 1 into the non-aqueous electrolyte of vinylene carbonate (VC) has a more prominent improvement effect on high-compacted-density lithium iron phosphate batteries.

5. After 1000 cycles, the lithium-ion batteries of Embodiment 5 and Comparative example 1 were disassembled to obtain negative electrode plates, which were imaged by SEM. The test structure obtained from Embodiment 5 is shown in FIG. 3, and the test results obtained from Comparative example 1 are shown in FIG. 4.

Figure 3:
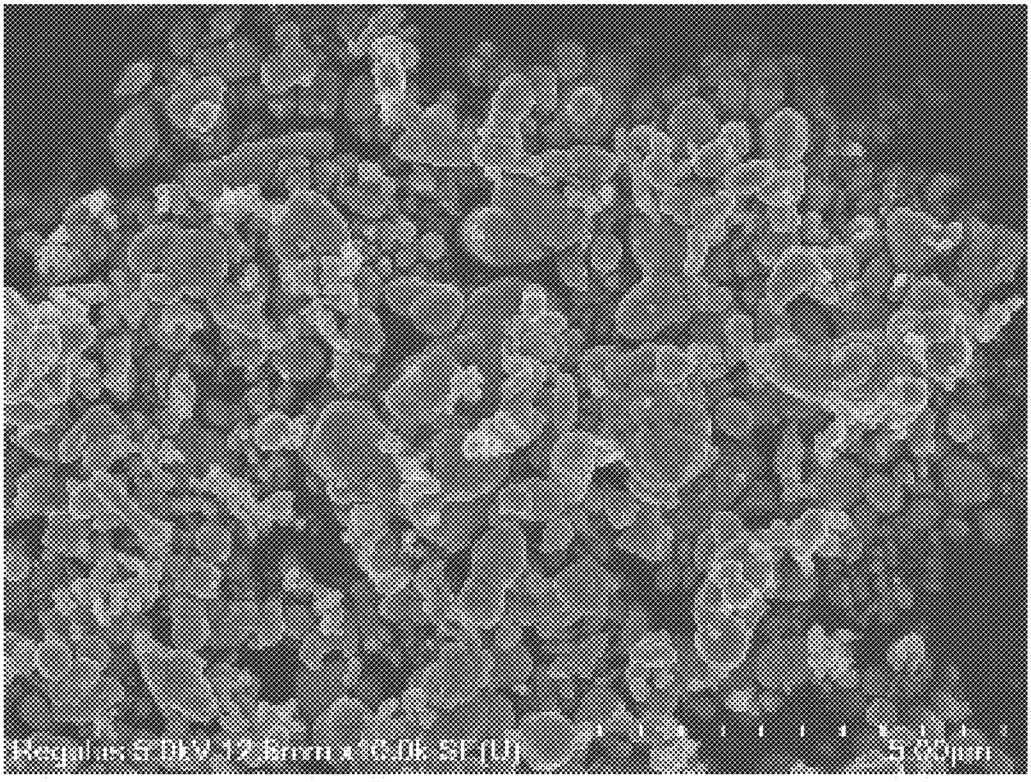
FIG. 3 is an SEM image of the negative electrode after the 1000th cycle of the battery according to Embodiment 5 of the present application.
Figure 4:
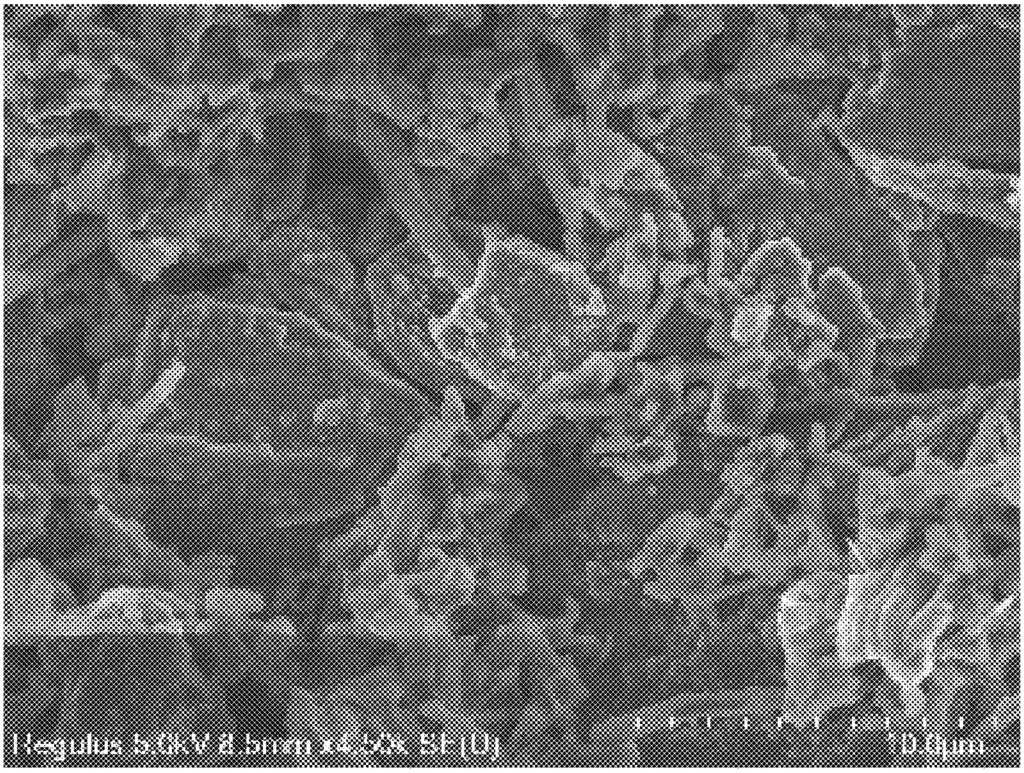
FIG. 4 is an SEM image of the negative electrode after the 1000th cycle of the battery according to Comparative example 1 of the present application.

As can be seen from FIGS. 3 and 4, compared with Comparative example 1, there are obvious lithium dendrites (rod-like structure in FIG. 4) on the negative electrode plate after 1000 cycles only when 2.0% VC is added to the electrolyte. While in Embodiment 1, when 0.5% of the compound represented by Structural formula 1 is added on the basis of 2.0% VC, there are almost no lithium dendrites on the negative electrode after 1000 cycles. Therefore, the combination of the compound represented by Structural formula 1 and vinylene carbonate (VC) can obviously inhibit the generation of lithium dendrites.

The above are only preferred embodiments of the present application, and not intended to limit the present application. Any modifications, equivalent substitutions and improvements made within the spirit and principle of the present application shall be included in the scope of protection of the present application.

The invention claimed is:

1. A lithium iron phosphate battery, comprising:

a positive electrode, a negative electrode and a non-aqueous electrolyte; wherein the positive electrode comprises a positive electrode material layer with a compacted density of 2.3-2.8 g/cc;

the positive electrode material layer comprises a positive electrode active material, the positive electrode active material comprises $LiFePO_4$;

the non-aqueous electrolyte comprises a solvent, an electrolyte salt, vinylene carbonate and a compound represented by Structural formula 1:

A-D-B-E-C    Structural formula 1 wherein A, B and C are each independently selected from a cyclic carbonate group, a cyclic sulfate group, a cyclic sulfite group, a cyclic sulfonate group, a cyclic sulfone group, a cyclic sulfoxide group, a cyclic carboxylate group or a cyclic anhydride group;

wherein D and E are independently selected from a single bond, or a group containing a hydrocarbylene group, an ether bond, a sulfur-oxygen double bond or a carbon-oxygen double bond; and wherein an addition amount of the compound represented by Structural formula 1 is 0.1-5%, and an addition amount of vinylene carbonate is 0.5%-3% based on a total mass of the non-aqueous electrolyte being 100%.

2. The lithium iron phosphate battery of claim 1, wherein a surface of the positive electrode material layer is detected by X-ray photoelectron spectroscopy, and when 1 s peak of carbon is obtained at 284.5 eV, a characteristic peak of S appears at a range of 162-174 eV.

3. The lithium iron phosphate battery of claim 1, wherein a charging and discharging voltage range of the lithium iron phosphate battery is 2.0-3.8V.

4. The lithium iron phosphate battery of claim 1, wherein:

the number of the cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups that each of A, B and C independently contains is 1-5; and the total number of the cyclic carbonate groups, cyclic sulfate groups, cyclic sulfite groups, cyclic sulfonate groups, cyclic sulfone groups, cyclic sulfoxide groups, cyclic carboxylate groups or cyclic anhydride groups that A, B and C contain is 10 or less.

5. The lithium iron phosphate battery of claim 1, wherein:

A and C are each independently selected from a group represented by Structural formula 2:

Structural formula 2

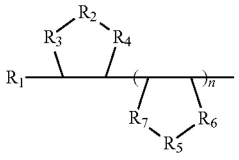

wherein n is an integer from 0 to 4, and $R_1$ is selected from hydrogen, halogen, a C1-C5 hydrocarbon group or halogenated hydrocarbon group; $R_2$, $R_3$, $R_4$, $R_5$, $R_6$ and $R_7$ are each independently selected from a C1-C3 alkylene group, a C1-C3 alkoxy group, oxygen atom,

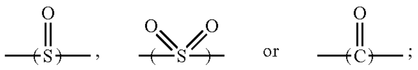

, or ;

at least one of $R_2$, $R_3$ and $R_4$ is selected from

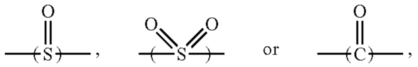

, or , at least one of $R_2$, $R_3$ and $R_4$ is selected from oxygen atom, at least one of $R_5$, $R_6$ and $R_7$ is selected from

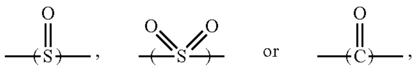

, or , and at least one of $R_5$, $R_6$ and $R_7$ is selected from oxygen atom.

6. The lithium iron phosphate battery of claim 1, wherein B is selected from a group represented by Structural formula 3:

Structural formula 3

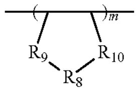

wherein m is an integer from 1 to 4; $R_8$, $R_9$ and $R_{10}$ are each independently selected from a C1-C3 alkylene group, a C1-C3 alkoxy group, oxygen atom,

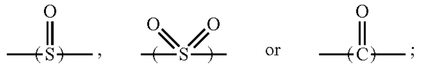

, or ;

at least one of $R_8$, $R_9$ and $R_{10}$ is selected from

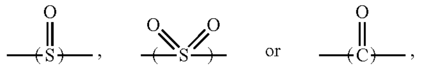

, or , and at least one of $R_8$, $R_9$ and $R_{10}$ is selected from oxygen atom.

7. The lithium iron phosphate battery of claim 1, wherein D and E are each independently selected from a group represented by Structural formula 4:

Structural formula 4

$-(R_{11}-R_{12}-R_{13})_z-$ wherein z is an integer from 0 to 4; $R_{11}$ and $R_{13}$ are each independently selected from a single bond or a C1-C5 alkylene group, and $R_{12}$ is selected from a single bond,

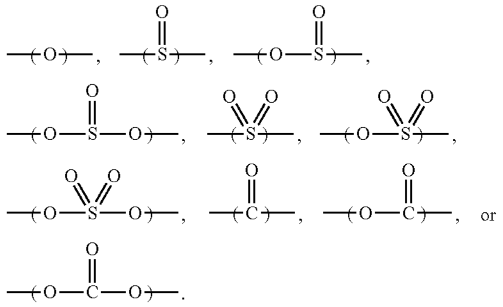

, , , , , , , , , or .

8. The lithium iron phosphate battery of claim 1, wherein A and C are the same, A and B are the same or different, D and E are the same.

9. The lithium iron phosphate battery of claim 1, wherein the compound represented by Structural formula 1 is selected from one or more of the following compounds:

Compound 1

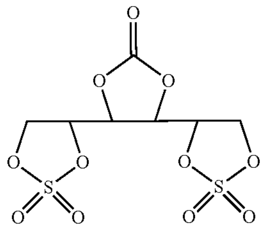

-continued
Compound 2
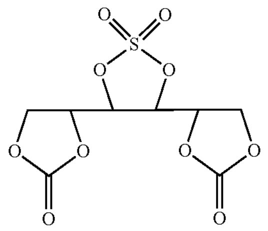
Compound 3
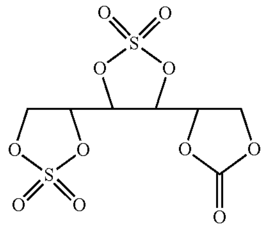
Compound 4
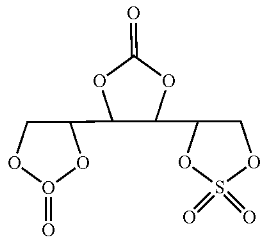
Compound 5
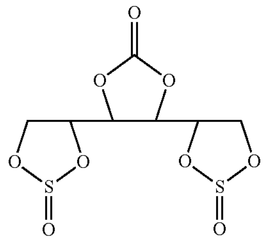
Compound 6
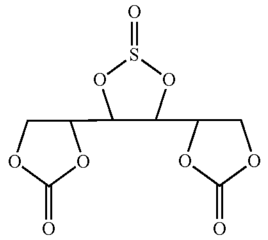
Compound 7
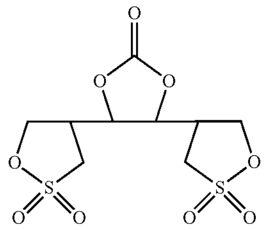
-continued
Compound 8
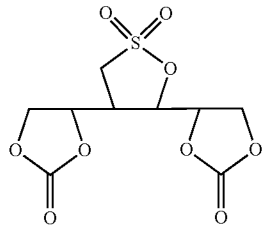
Compound 9
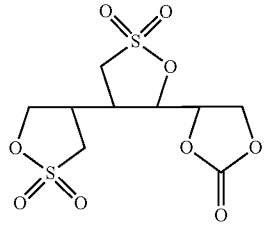
Compound 10
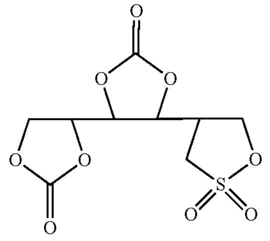
Compound 11
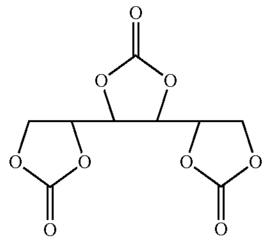
Compound 12
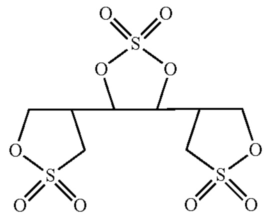
Compound 1-13
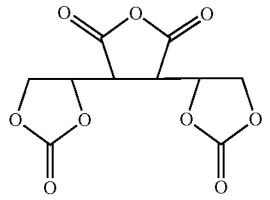
Compound 1-14
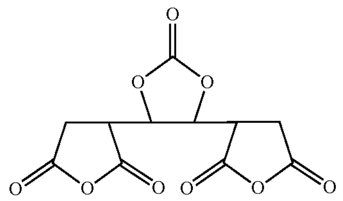

-continued
Compound 1-15
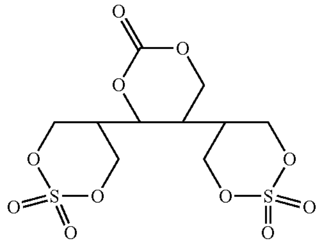
Compound 1-16
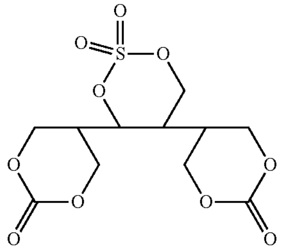
Compound 17
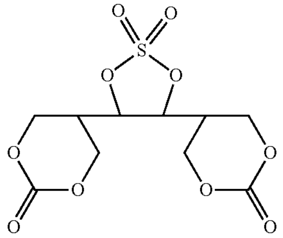
Compound 18
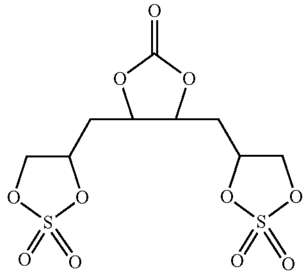
Compound 19
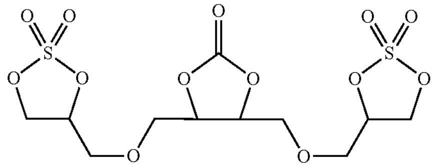
Compound 20
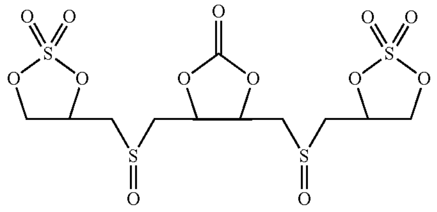
-continued
Compound 21
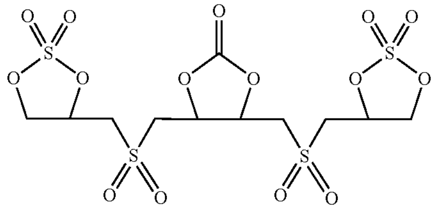
Compound 22
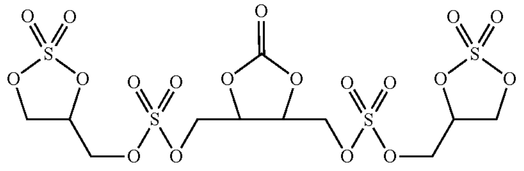
Compound 23
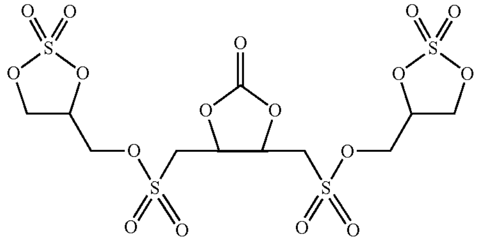
Compound 24
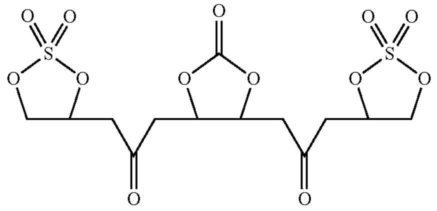
Compound 25
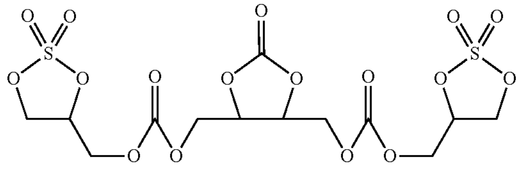
Compound 26
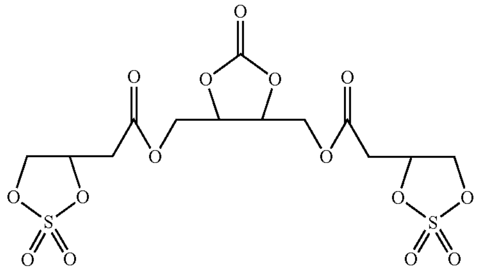
Compound 27
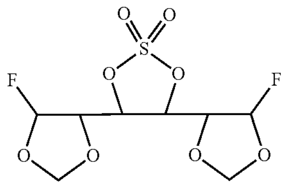

-continued
Compound 28
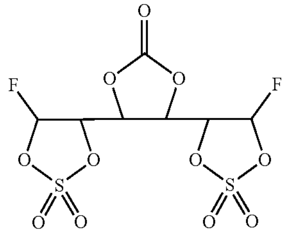
Compound 29
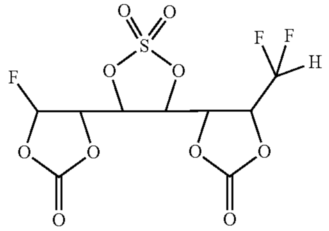
Compound 30
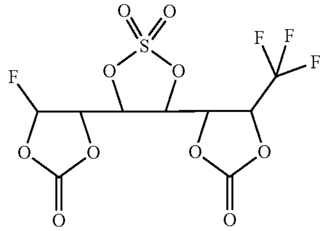
Compound 31
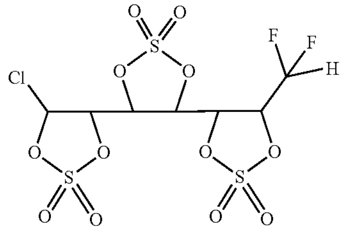
Compound 32
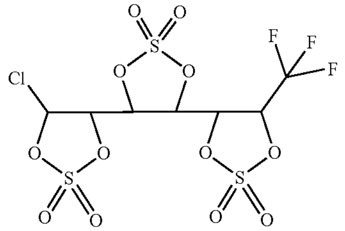
Compound 33
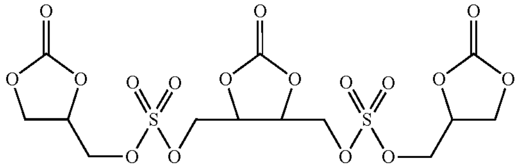
Compound 34
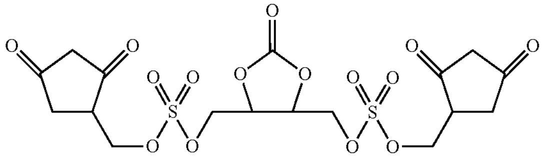
-continued
Compound 35
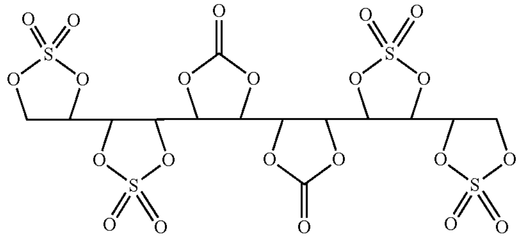
Compound 36
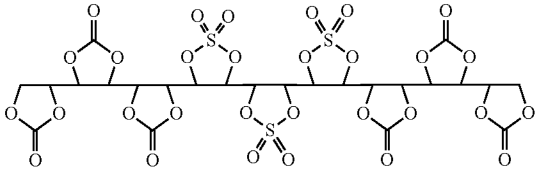
Compound 37
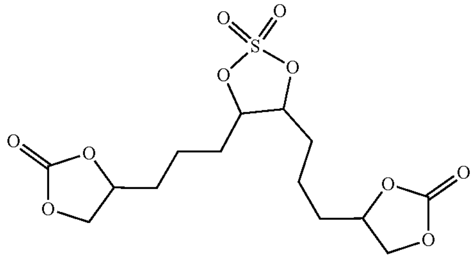
Compound 38
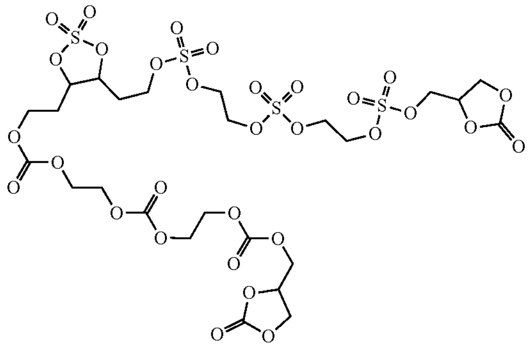
Compound 39
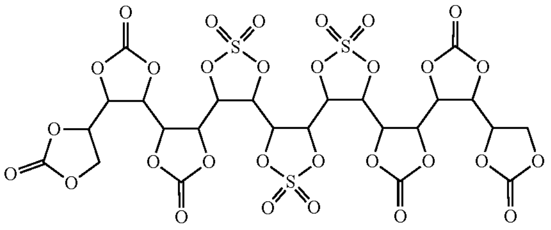

-continued

Compound 40

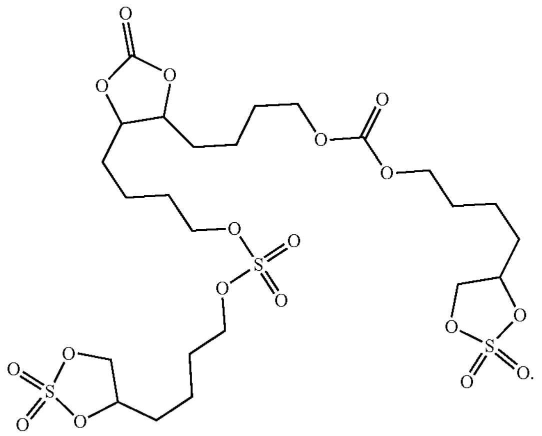

10. The lithium iron phosphate battery of claim 1, wherein the addition amount of vinylene carbonate is 0.5-2% based on the total mass of the non-aqueous electrolyte being 100%.

11. The lithium iron phosphate battery of claim 1, wherein:

the non-aqueous electrolyte further comprises a supplemental additive;

the supplemental additive comprises at least one of a fluorinated cyclic carbonate compound, sulfonic acid lactone compound, aromatic additive, fluorine-containing anisole compound, dicarboxylic anhydride, lithium difluorophosphate, ethylene sulfate (DTD), lithium difluorosulfomide (LiFSI), methylene methyl disulfonate, tri (trimethylsilane) phosphate, and tri (trimethylsilane) borate.

12. The lithium iron phosphate battery of claim 11, wherein a mass percentage content of any one of the supplementary additives in the non-aqueous electrolyte is below 10%.

13. The lithium iron phosphate battery of claim 12, wherein a mass percentage content of any one of the supplementary additives in the non-aqueous electrolyte is 0.1-5%.

14. The lithium iron phosphate battery of claim 11, wherein the supplementary additive is selected from one or more of 1,3-propane sultone, methylene methyl disulfonate, fluoroethylene carbonate and ethylene sulfate.

* * * * *